(12) United States Patent
Saponja et al.

(10) Patent No.: US 10,253,611 B2
(45) Date of Patent: Apr. 9, 2019

(54) APPARATUSES, SYSTEMS, AND METHODS FOR IMPROVING DOWNHOLE SEPARATION OF GASES FROM LIQUIDS WHILE PRODUCING RESERVOIR FLUID

(71) Applicant: Heal Systems LP, Calgary (CA)

(72) Inventors: Jeffrey Charles Saponja, Calgary (CA); Robbie Singh Hari, Calgary (CA); Tim Keith, Calgary (CA); Shawn Deugo, Calgary (CA)

(73) Assignee: Heal Systems LP, Alberta (CA)

( * ) Notice: Subject to any disclaimer, the term of this patent is extended or adjusted under 35 U.S.C. 154(b) by 0 days.

(21) Appl. No.: 16/013,765

(22) Filed: Jun. 20, 2018

(65) Prior Publication Data
US 2018/0306019 A1    Oct. 25, 2018

Related U.S. Application Data

(63) Continuation of application No. PCT/CA2018/050034, filed on Jan. 12, 2018.

(60) Provisional application No. 62/445,568, filed on Jan. 12, 2017, provisional application No. 62/445,576, filed on Jan. 12, 2017, provisional application No. 62/445,582, filed on Jan. 12, 2017, provisional application No. 62/445,583, filed on Jan. 12, 2017.

(51) Int. Cl.
| | |
|---|---|
| *E21B 43/38* | (2006.01) |
| *E21B 43/12* | (2006.01) |
| *B01D 19/00* | (2006.01) |

(52) U.S. Cl.
CPC .............. *E21B 43/38* (2013.01); *B01D 19/00* (2013.01); *B01D 19/0042* (2013.01); *E21B 43/121* (2013.01)

(58) Field of Classification Search
CPC ................................ E21B 43/38; E21B 43/121
See application file for complete search history.

(56) References Cited

U.S. PATENT DOCUMENTS

| | | |
|---|---|---|
| 5,482,117 A | 1/1996 | Kolpak et al. |
| 2015/0075772 A1 | 3/2015 | Saponja et al. |
| 2015/0267519 A1* | 9/2015 | Saponja ................ E21B 43/122 166/54.1 |

FOREIGN PATENT DOCUMENTS

WO    2015/035509    3/2015

OTHER PUBLICATIONS

International Search Report and Written Opinion issued in PCT/CA2018/050034, dated Mar. 27, 2018 (8 pages).

* cited by examiner

*Primary Examiner* — Giovanna C. Wright
(74) *Attorney, Agent, or Firm* — Fish & Richardson P.C.

(57) ABSTRACT

A reservoir fluid production system for producing reservoir fluid from a subterranean formation is provided for mitigating gas interference by effecting downhole separation of a gaseous phase from reservoir fluids, while mitigating entrainment of liquid hydrocarbon material within the gaseous phase.

30 Claims, 13 Drawing Sheets

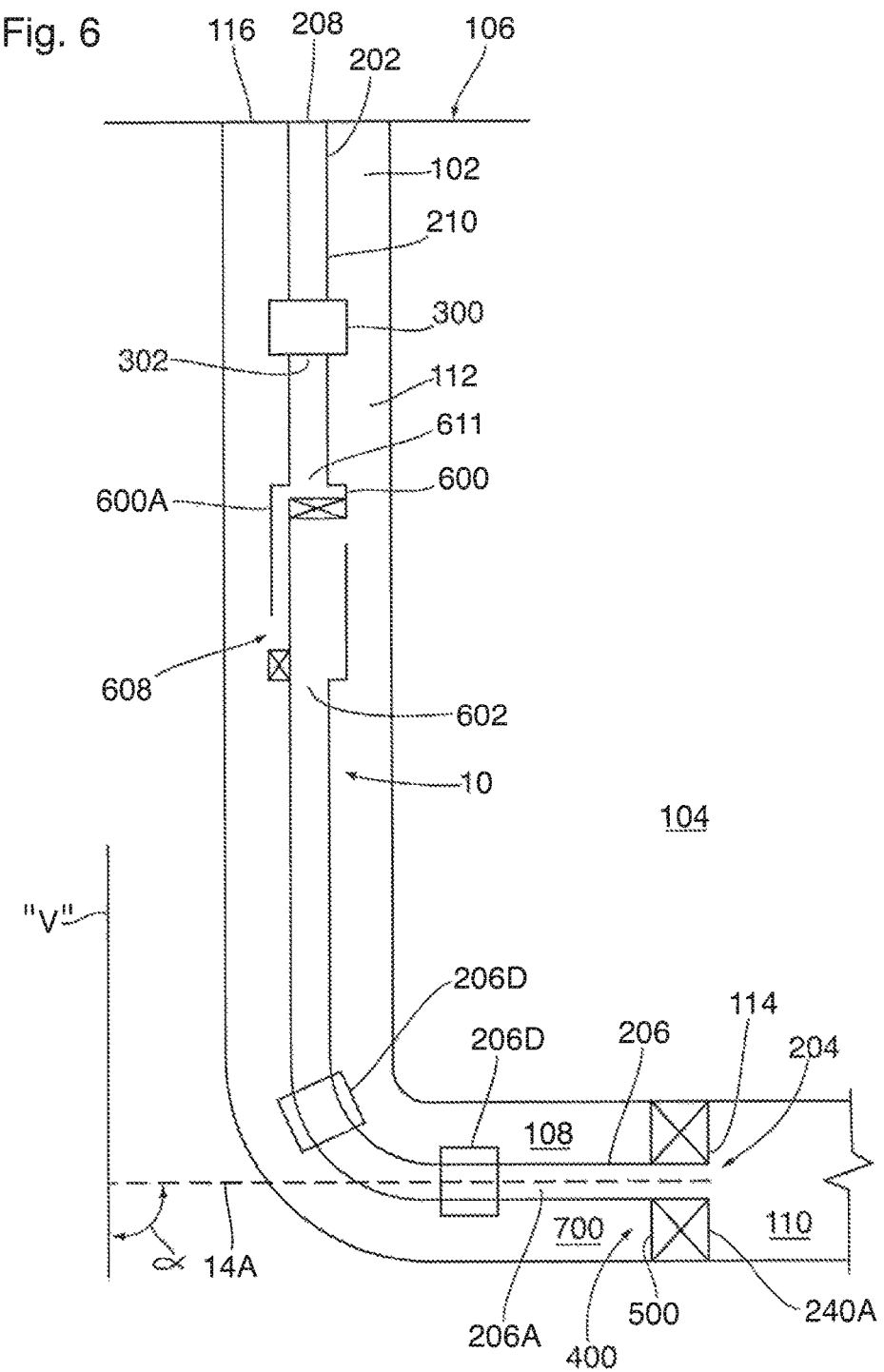

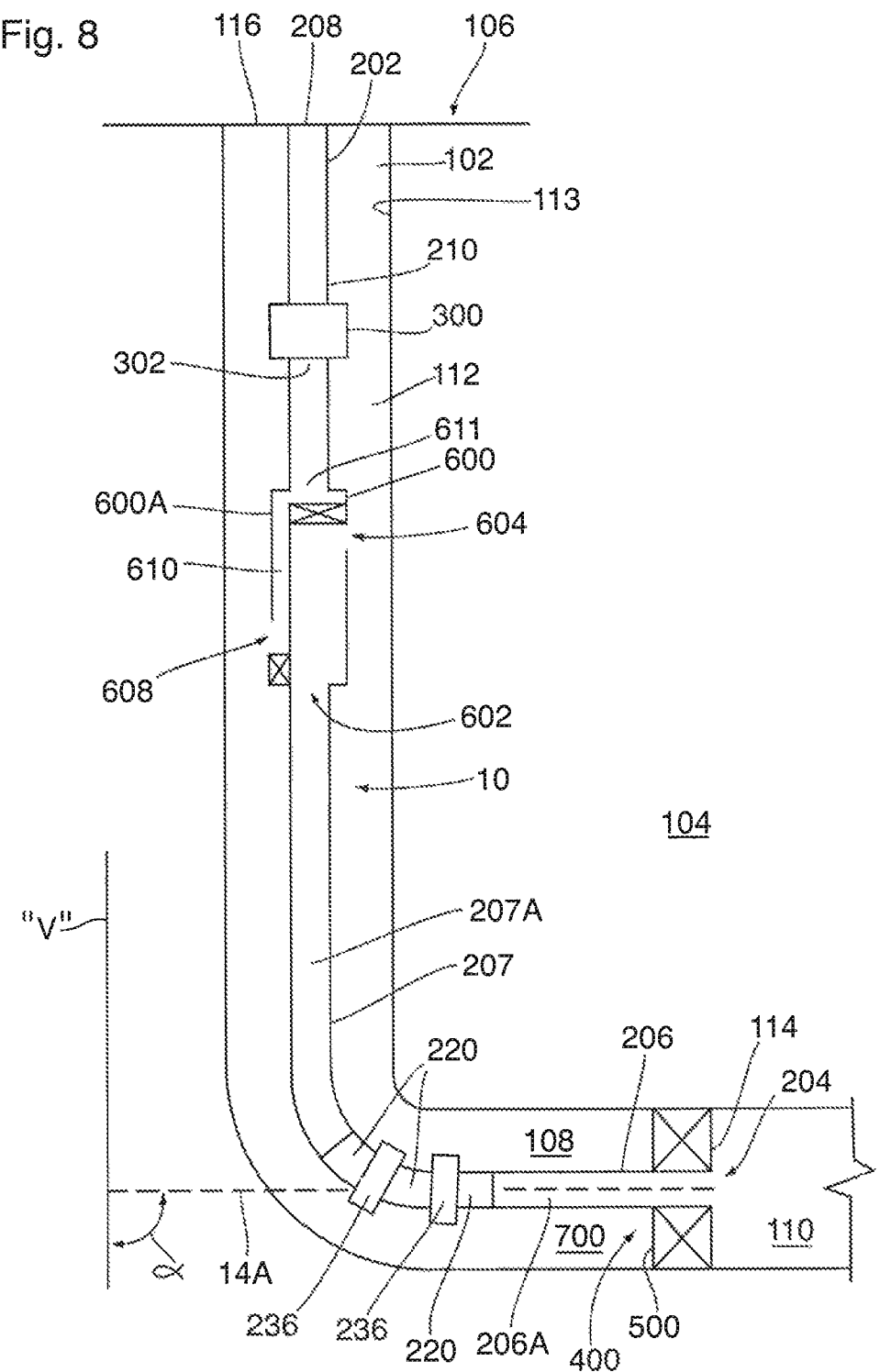

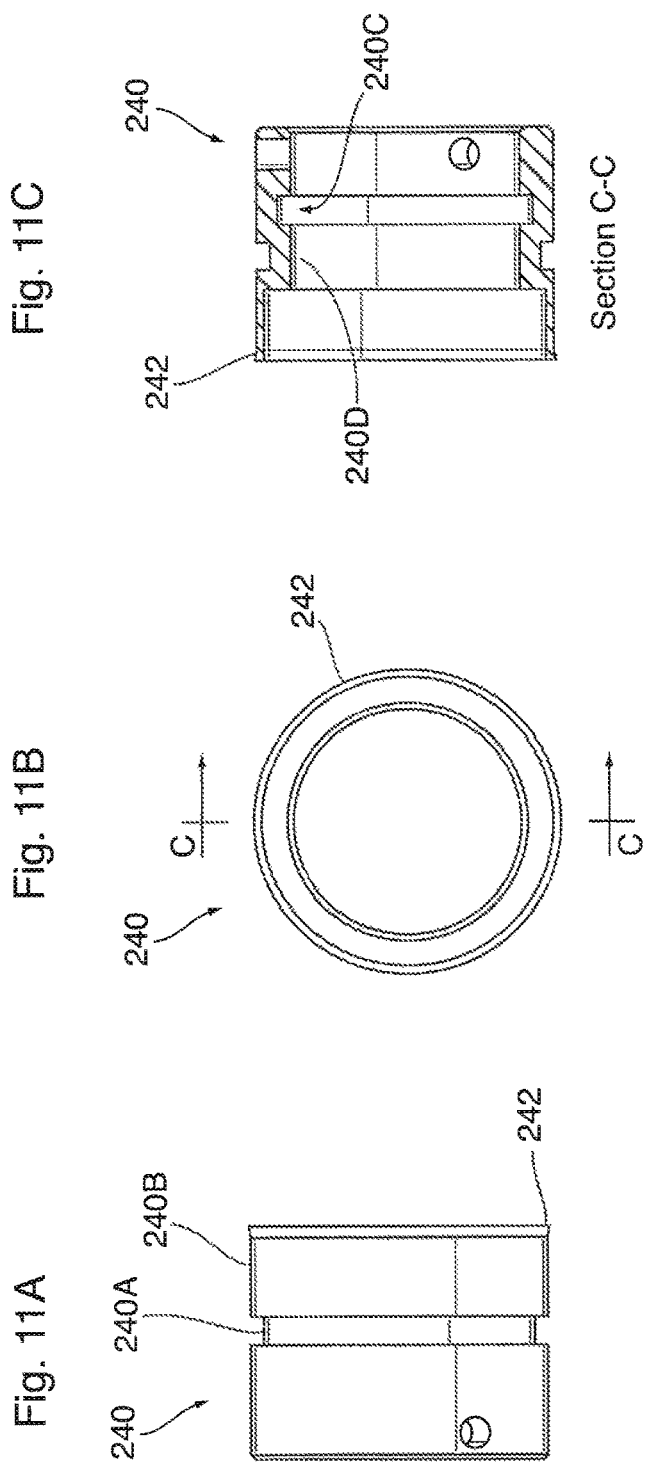

Section A-A

Section B-B

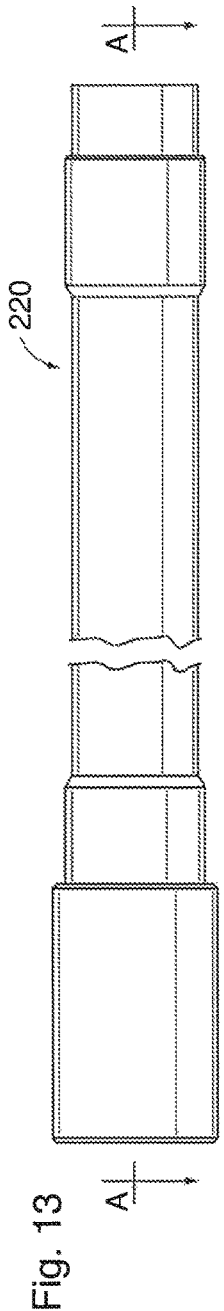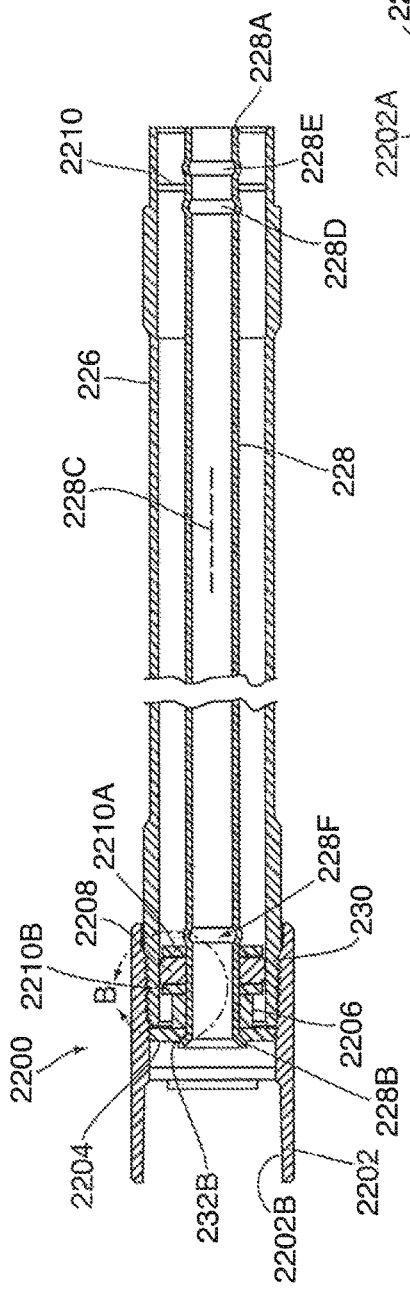

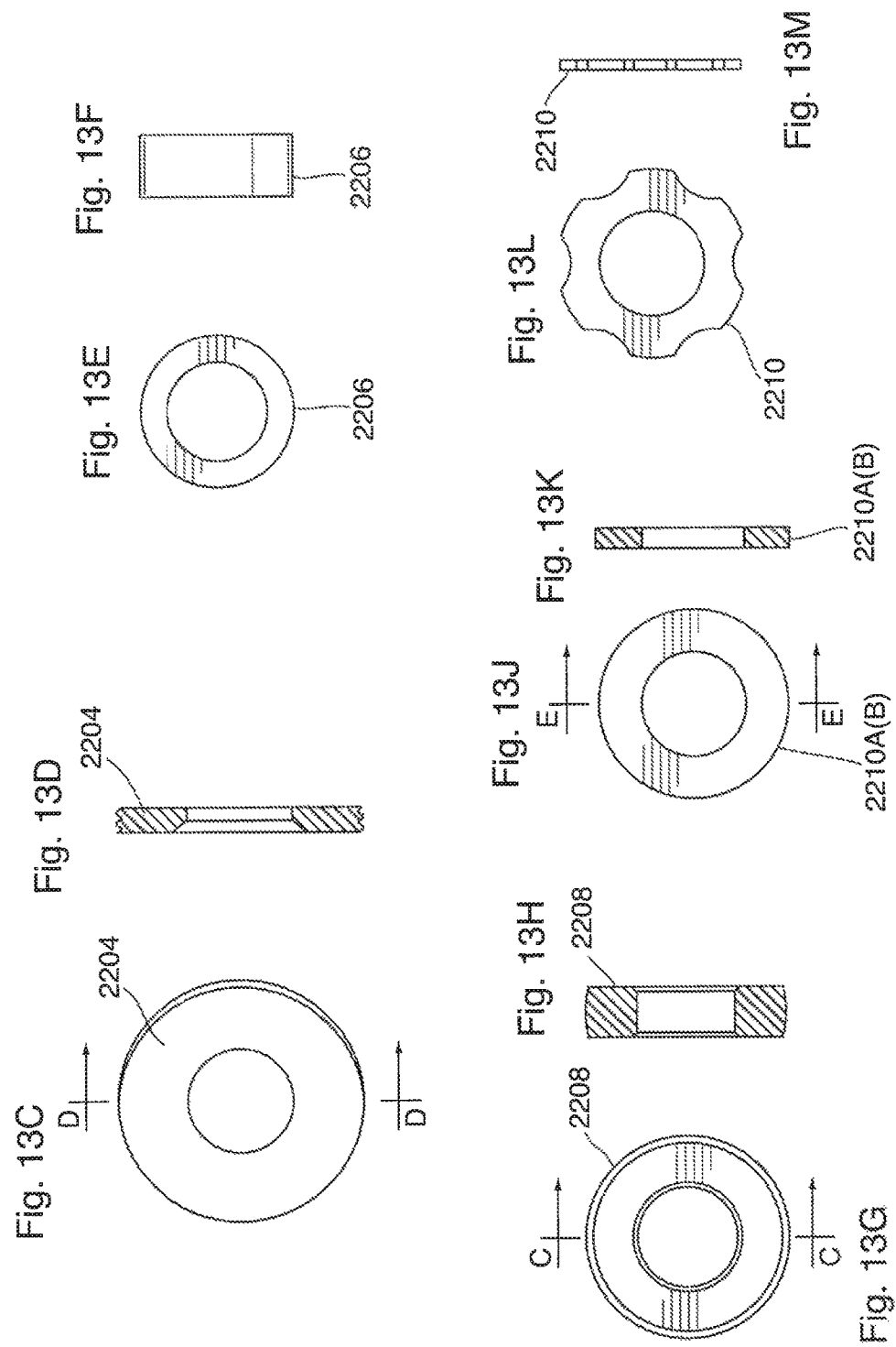

APPARATUSES, SYSTEMS, AND METHODS FOR IMPROVING DOWNHOLE SEPARATION OF GASES FROM LIQUIDS WHILE PRODUCING RESERVOIR FLUID

CROSS-REFERENCE TO RELATED APPLICATIONS

This application is a continuation of and claims priority under 35 U.S.C. § 120 from PCT Application No. PCT/CA2018/050034 filed on Jan. 12, 2018, which claims priority from U.S. Application Nos. 62/445,568, 62/445,576, 62/445,582, and 62/445,583, filed on Jan. 12, 2017. The entire contents of each of these priority applications are incorporated herein by reference.

TECHNICAL FIELD

The present disclosure relates to mitigating downhole pump gas interference during hydrocarbon production.

BACKGROUND

Downhole pump gas interference is a problem encountered while producing wells, especially wells with horizontal sections. In producing reservoir fluids containing a significant fraction of gaseous material, the presence of such gaseous material hinders production by contributing to sluggish flow.

SUMMARY

In one aspect, there is provided a reservoir fluid conduction assembly for disposition within a wellbore string, that is lining a wellbore that is extending into a subterranean formation, such that an intermediate wellbore space is defined within a space that is disposed between the wellbore string and the assembly, wherein the assembly includes: a reservoir fluid-supplying conductor for conducting reservoir fluid that is being received from a downhole wellbore space of the wellbore; a flow diverter body including (a) a diverter body-defined reservoir fluid conductor for conducting reservoir fluid, that is supplied from the reservoir fluid-supplying conductor, to a reservoir fluid separation space of an uphole wellbore space of the wellbore, the uphole wellbore space being disposed uphole relative to the downhole wellbore space, and (b) a diverter body-defined gas-depleted reservoir fluid conductor for receiving gas-depleted reservoir fluid and conducting the received gas-depleted reservoir fluid for effecting supplying of the gas-depleted reservoir fluid to a gas-depleted reservoir fluid-producing conductor; a sealed interface effector for co-operating with the wellbore string for establishing a sealed interface a sealed interface for preventing, or substantially preventing, bypassing of the diverter body-defined gas-depleted reservoir fluid conductor by the separated gas-depleted reservoir fluid; and an anchor for coupling the assembly to the wellbore string; wherein: the flow diverter body, the sealed interface effector, the reservoir fluid-supplying conductor, and the anchor are co-operatively configured such that, while the assembly is coupled to the wellbore string by the anchor, and disposed within the wellbore string such that the sealed interface is defined, and the reservoir fluid-supplying conductor is receiving reservoir fluid from the downhole wellbore space that has been received within the downhole wellbore space from the subterranean formation: the reservoir fluid is conducted to the diverter body-defined reservoir fluid conductor via the reservoir fluid-supplying conductor; the reservoir fluid is conducted by the diverter body-defined reservoir fluid conductor and discharged to a reservoir fluid separation space of the uphole wellbore space; within the reservoir fluid separation space, a gas-depleted reservoir fluid and a gaseous material are separated from the discharged reservoir fluid, in response to at least buoyancy forces, such that the gas-depleted reservoir fluid and the separated gaseous material are obtained; the separated gas-depleted reservoir fluid is conducted to the diverter body-defined gas-depleted reservoir fluid conductor, via the intermediate wellbore space, for conduction to the surface via a gas-depleted reservoir fluid producing conductor; and the separated gaseous material is conducted to the surface via the intermediate wellbore space, and there is an absence, or substantial absence, of opposition to conduction of the separated gaseous material to the surface, via the intermediate wellbore space, by the anchor; and the reservoir fluid separation space defines a separation-facilitating space portion of the intermediate wellbore space.

In another aspect, there is provided a reservoir fluid conduction assembly for disposition within a wellbore string, that is lining a wellbore that is extending into a subterranean formation, wherein the assembly includes: a reservoir fluid-supplying conductor for conducting reservoir fluid that is being received from the subterranean formation; a gas separator, fluidly coupled to the reservoir fluid-supplying conductor for receiving the reservoir fluid conducted by the reservoir fluid-supplying conductor, and effecting separation of gaseous material from the reservoir fluid such that a gaseous-depleted reservoir fluid and a gaseous material are obtained; and an anchor for coupling the assembly to the wellbore string; wherein: the gas separator, the reservoir fluid-supplying conductor, and the anchor are co-operatively configured such that, while the assembly is coupled to the wellbore string by the anchor, and the reservoir fluid-supplying conductor is receiving reservoir fluid from the downhole wellbore space that has been received within the downhole wellbore space from the subterranean formation: the reservoir fluid is conducted to the separator via the reservoir fluid-supplying conductor; a gas-depleted reservoir fluid and a gaseous material are separated from the discharged reservoir fluid by the separator; and the separated gaseous material is conducted to the surface via the wellbore, wherein there is an absence, or substantial absence, of opposition to flow of the separated gaseous material to the surface, via the wellbore, by the anchor.

In another aspect, there is provided a reservoir fluid production system for producing reservoir fluid from a subterranean formation, comprising: a wellbore; a wellbore string that is lining the wellbore; wherein: the wellbore includes a wellbore space; and the wellbore space includes a downhole wellbore space and an uphole wellbore space, wherein the uphole wellbore space is disposed uphole relative to the downhole wellbore space; and a reservoir fluid conduction assembly disposed within wellbore string and including: a reservoir fluid-supplying conductor for receiving reservoir fluid from the downhole wellbore space; a gas-depleted reservoir fluid conductor for receiving a gas-depleted reservoir fluid; an anchor for coupling the assembly to the wellbore string; wherein: the wellbore string and the assembly are co-operatively configured such that, while the downhole wellbore space is receiving reservoir fluid from the subterranean formation: the reservoir fluid is conducted by the reservoir fluid-supplying conductor to a reservoir fluid separation space of the uphole wellbore space with effect that a gas-depleted reservoir fluid and a gaseous material are separated from the reservoir fluid within the reservoir fluid separation space, in response to at least buoyancy forces, such that the gas-depleted reservoir fluid and the gaseous material are obtained; the gas-depleted reservoir material is conducted to the gas-depleted reservoir fluid conductor with effect that the gas-depleted reservoir fluid is conducted through the gas-depleted reservoir fluid conductor to the surface; and the separated gaseous material is conducted to the surface via the intermediate wellbore space, and there is an absence, or substantial absence, of opposition to conduction of the separated gaseous material to the surface, via the intermediate wellbore space, by the anchor.

In another aspect, there is provided a system including a reservoir fluid conduction assembly disposed within a wellbore string, that is lining a wellbore that is extending into a subterranean formation, such that an intermediate wellbore space is defined within a space that is disposed between the wellbore string and the assembly, wherein the assembly includes: a reservoir fluid-supplying conductor for conducting reservoir fluid that is being received from a downhole wellbore space of the wellbore; a flow diverter body including (a) a diverter body-defined reservoir fluid conductor for conducting reservoir fluid, that is supplied from the reservoir fluid-supplying conductor, to a reservoir fluid separation space of an uphole wellbore space of the wellbore, the uphole wellbore space being disposed uphole relative to the downhole wellbore space, and (b) a diverter body-defined gas-depleted reservoir fluid conductor for receiving gas-depleted reservoir fluid and conducting the received gas-depleted reservoir fluid for effecting supplying of the gas-depleted reservoir fluid to a gas-depleted reservoir fluid-producing conductor; and a sealed interface for preventing, or substantially preventing, bypassing of the diverter body-defined reservoir fluid conductor by the separated gas-depleted reservoir fluid; wherein: the flow diverter body, the sealed interface effector, and the reservoir fluid-supplying conductor are co-operatively configured such that, while the reservoir fluid-supplying conductor is receiving reservoir fluid from the downhole wellbore space that has been received within the downhole wellbore space from the subterranean formation: the reservoir fluid is conducted to the diverter body-defined reservoir fluid conductor via the reservoir fluid-supplying conductor; the reservoir fluid is conducted by the diverter body-defined reservoir fluid conductor and discharged to a reservoir fluid separation space of the uphole wellbore space; within the reservoir fluid separation space, a gas-depleted reservoir fluid is separated from the discharged reservoir fluid, in response to at least buoyancy forces; and the separated gas-depleted reservoir fluid is conducted to the diverter body-defined gas-depleted reservoir fluid-diverting conductor, via the intermediate wellbore space, for conduction to the surface via a gas-depleted reservoir fluid producing conductor; the reservoir fluid separation space defines a separation-facilitating space portion of the intermediate wellbore space; the reservoir fluid-supplying conductor includes: a vertical section-disposed portion having a central longitudinal axis that is less than 20 degrees relative to the vertical; a horizontal-section disposed portion having a central longitudinal axis that is between 70 and 110 degrees relative to the vertical; and a transition section-disposed portion disposed between the vertical section-disposed portion and the horizontal section-disposed portion and a cross-sectional area of the fluid passage of the transition section-disposed portion is less than both of: (i) a cross-sectional area of the fluid passage of the vertical section-disposed portion, and (ii) a cross-sectional area of the fluid passage of the horizontal section-disposed portion.

In another aspect, there is provided a system including a reservoir fluid-supplying conductor, disposed within a wellbore, and including: a conductor inlet for receiving reservoir fluid flow from the wellbore; a vertical section-disposed portion having a central longitudinal axis that is less than 20 degrees relative to the vertical; a horizontal section-disposed portion having a central longitudinal axis that is between 70 and 110 degrees relative to the vertical; and a transition section-disposed portion that is disposed between the vertical and horizontal sections; wherein a cross-sectional area of the fluid passage of the transition section-disposed portion is less than both of: (i) a cross-sectional area of the fluid passage of the vertical section-disposed portion, and (ii) a cross-sectional area of the fluid passage of the horizontal section-disposed portion. In another aspect, there is provided a reservoir fluid conduction assembly for disposition within a wellbore string, that is lining a wellbore that is extending into a subterranean formation, such that an intermediate wellbore space is defined within a space that is disposed between the wellbore string and the assembly, wherein the assembly includes: a reservoir fluid-supplying conductor for conducting reservoir fluid that is being received from a downhole wellbore space of the wellbore; a flow diverter body including (a) a diverter body-defined reservoir fluid conductor for conducting reservoir fluid, that is supplied from the reservoir fluid-supplying conductor, to a reservoir fluid separation space of an uphole wellbore space of the wellbore, the uphole wellbore space being disposed uphole relative to the downhole wellbore space, and (b) a diverter body-defined gas-depleted reservoir fluid conductor for receiving gas-depleted reservoir fluid and conducting the received gas-depleted reservoir fluid for effecting supplying of the gas-depleted reservoir fluid to a gas-depleted reservoir fluid-producing conductor; and a sealed interface effector for co-operating with the wellbore string for establishing a sealed interface for preventing, or substantially preventing, bypassing of the diverter body-defined reservoir fluid conductor by the separated gas-depleted reservoir fluid. wherein: the flow diverter body, the sealed interface effector, and the reservoir fluid-supplying conductor are co-operatively configured such that, while the assembly is disposed within the wellbore string, such that the sealed interface is defined, and the reservoir fluid-supplying conductor is receiving reservoir fluid from the downhole wellbore space that has been received within the downhole wellbore space from the subterranean formation: the reservoir fluid is conducted to the diverter body-defined reservoir fluid conductor via the reservoir fluid-supplying conductor; the reservoir fluid is conducted by the diverter body-defined reservoir fluid conductor and discharged to a reservoir fluid separation space of the uphole wellbore space; within the reservoir fluid separation space, a gas-depleted reservoir fluid is separated from the discharged reservoir fluid, in response to at least buoyancy forces; and the separated gas-depleted reservoir fluid is conducted to the diverter body-defined gas-depleted reservoir fluid conductor, via the intermediate wellbore space, for conduction to the surface via a gas-depleted reservoir fluid producing conductor; the reservoir fluid separation space defines a separation-facilitating space portion of the intermediate wellbore space; and the reservoir fluid-supplying conductor includes a contoured section that is contoured with effect that, while a reservoir fluid is being flowed through the reservoir fluid-supplying conductor, a swirl in the reservoir fluid flow is induced.

In another aspect, there is provided a reservoir fluid conduction assembly for disposition within a wellbore that is extending into a subterranean formation, wherein the assembly includes: a reservoir fluid-supplying conductor for conducting reservoir fluid that is being received from the subterranean formation; a gas separator, fluidly coupled to the reservoir fluid-supplying conductor for receiving the reservoir fluid conducted by the reservoir fluid-supplying conductor, and effecting separation of gaseous material from the reservoir fluid such that a gaseous-depleted reservoir fluid is obtained; and wherein: the gas separator and the reservoir fluid-supplying conductor are co-operatively configured such that, while the assembly is disposed within the wellbore, and the reservoir fluid-supplying conductor is receiving reservoir fluid from the wellbore that has been received within the wellbore from the subterranean formation: the reservoir fluid is conducted to the gas separator via the reservoir fluid-supplying conductor; and gaseous material is separated from the discharged reservoir fluid by the separator such that a gas-depleted reservoir fluid is obtained; and the reservoir fluid-supplying conductor includes a contoured section that is contoured with effect that, while a reservoir fluid is being flowed through the reservoir fluid-supplying conductor, a swirl in the reservoir fluid flow is induced.

In another aspect, there is provided a reservoir fluid conduction assembly, disposed within a wellbore, wherein the reservoir fluid conduction assembly comprises: a reservoir fluid-supplying conductor for conducting reservoir fluid that is being received from the subterranean formation; wherein: the reservoir fluid-supplying conductor includes a contoured section that is contoured with effect that, while a reservoir fluid is being flowed through the reservoir fluid-supplying conductor, a swirl in the reservoir fluid flow is induced.

In another aspect, there is provided a reservoir fluid conduction assembly for disposition within a wellbore string, that is lining a wellbore that is extending into a subterranean formation, such that an intermediate wellbore space is defined within a space that is disposed between the wellbore string and the assembly, wherein the assembly includes: a reservoir fluid-supplying conductor, for conducting reservoir fluid that is being received from a downhole wellbore space of the wellbore, and including a fluid conductor subassembly that includes: a first tubing defining a conductor inlet; a second tubing disposed within the first tubing such that an intermediate subassembly space is defined between the first tubing and the second tubing; and a subassembly sealed interface disposed within the intermediate subassembly space between the first tubing and the second tubing; a flow diverter body including (a) a diverter body-defined reservoir fluid conductor for conducting reservoir fluid, that is supplied from the reservoir fluid-supplying conductor, to a reservoir fluid separation space of an uphole wellbore space of the wellbore, the uphole wellbore space being disposed uphole relative to the downhole wellbore space, and (b) a diverter body-defined gas-depleted reservoir fluid conductor for receiving gas-depleted reservoir fluid and conducting the received gas-depleted reservoir fluid for effecting supplying of the gas-depleted reservoir fluid to a gas-depleted reservoir fluid-producing conductor; and a sealed interface effector for co-operating with the wellbore string for establishing a sealed interface for preventing, or substantially preventing, bypassing of the diverter body-defined reservoir fluid conductor by the separated gas-depleted reservoir fluid; wherein: the flow diverter body, the sealed interface effector, and the reservoir fluid-supplying conductor are co-operatively configured such that, while the assembly is disposed within the wellbore string, such that the sealed interface is defined, and the reservoir fluid-supplying conductor is receiving reservoir fluid from the downhole wellbore space that is being received within the downhole wellbore space from the subterranean formation: reservoir fluid is conducted, via the reservoir fluid-supplying conductor, including via the second tubing, to the diverter body-defined reservoir fluid conductor; while the conducting of the reservoir fluid is being effected via the second tubing, the subassembly sealed interface prevents, or substantially prevents, the reservoir fluid, being conducted by the second tubing, from bypassing the diverter body-defined reservoir fluid conductor; the reservoir fluid is conducted by the diverter body-defined reservoir fluid conductor and discharged to a reservoir fluid separation space of the uphole wellbore space; within the reservoir fluid separation space, a gas-depleted reservoir fluid is separated from the discharged reservoir fluid, in response to at least buoyancy forces; and the separated gas-depleted reservoir fluid is conducted to the diverter body-defined gas-depleted reservoir fluid conductor, via the intermediate wellbore space, for conduction to the surface via a gas-depleted reservoir fluid producing conductor; the reservoir fluid separation space defines a separation-facilitating space portion of the intermediate wellbore space.

In another aspect, there is provided a reservoir fluid conduction assembly for disposition within a wellbore that is extending into a subterranean formation, wherein the assembly includes: a reservoir fluid-supplying conductor, for conducting reservoir fluid that is being received from the subterranean formation via the wellbore, and including a fluid conductor subassembly that includes: a first tubing defining a conductor inlet; a second tubing disposed within the first tubing such that an intermediate subassembly space is defined between the first tubing and the second tubing; and a subassembly sealed interface disposed within the intermediate subassembly space between the first and second tubing; and a gas separator, fluidly coupled to the reservoir fluid-supplying conductor for receiving the reservoir fluid conducted by the reservoir fluid-supplying conductor, and effecting separation of gaseous material from the reservoir fluid such that a gaseous-depleted reservoir fluid is obtained; wherein: the gas separator and the reservoir fluid-supplying conductor are co-operatively configured such that, while the assembly is disposed within the wellbore, and the reservoir fluid-supplying conductor is receiving reservoir fluid from the wellbore that has been received within the wellbore from the subterranean formation: the reservoir fluid is conducted, via the reservoir fluid-supplying conductor, including via the second tubing, to the separator; while the conducting of the reservoir fluid is being effected via the second tubing, the subassembly sealed interface prevents, or substantially prevents, the reservoir fluid, being conducted by the second tubing, from bypassing the diverter body-defined reservoir fluid conductor; and gaseous material are separated from the discharged reservoir fluid by the separator such that gas-depleted reservoir fluid is obtained.

In another aspect, there is provided a fluid production assembly comprising a plurality of fluid conductor modules connected end to end, wherein each one of the fluid conductor modules, independently, includes: a first tubing; a second tubing disposed within the first tubing such that an intermediate space is defined between the first tubing and the second tubing; and a subassembly sealed interface disposed between the first tubing and the second tubing.

In another aspect, there is provided a fluid conductor module comprising: a first tubing; a second tubing disposed within the first tubing such that an intermediate space is defined between the first tubing and the second tubing; and a subassembly sealed interface disposed between the first tubing and the second tubing.

BRIEF DESCRIPTION OF DRAWINGS

The preferred embodiments will now be described with reference to the following accompanying drawings:

FIG. 6 is a schematic illustration of another embodiment of a system including a reservoir fluid production assembly disposed within a wellbore, similar to the system illustrated in FIG. 1, and having a reservoir fluid-supplying conductor including contoured portions;

FIG. 8 is a schematic illustration of another embodiment of a system including a reservoir fluid production assembly, similar to the embodiment in FIG. 1, and having a reservoir fluid-supplying conductor that comprises fluid conductor modules;

FIG. 11A is a side elevation view of an embodiment of a sealing ring for integration into the fluid conductor module illustrated in FIG. 9;

FIG. 11B is a view from one end of the sealing ring illustrated in FIG. 11A;

FIG. 11C is a sectional elevation view, taken along lines C-C in FIG. 11B, of the sealing ring illustrated in FIG. 11A;

FIG. 13 is a side elevation view of another embodiment of a fluid conductor module that are integratable within the reservoir fluid-supplying conductor illustrated in FIG. 8;

FIG. 13A is sectional side elevation view of the fluid conductor module illustrated in FIG. 13A;

FIG. 13B is an enlarged view of detail "B" in FIG. 13A;

FIG. 13C is a front elevation view of a hanger of the fluid conductor module illustrated in FIG. 13A;

FIG. 13D is a sectional side elevation of the hanger illustrated in FIG. 13C taken along lines D-D;

FIG. 13E is a front elevation view of a spacer of the fluid conductor module illustrated in FIG. 13A;

FIG. 13F is s side elevation of the spacer illustrated in FIG. 13E;

FIG. 13G is a front elevation view of a sealing member of the fluid conductor module illustrated in FIG. 13A;

FIG. 13H is a sectional side elevation of the sealing member illustrated in FIG. 13G taken along lines C-C;

FIG. 13J is a front elevation view of a sealing member retainer of the fluid conductor module illustrated in FIG. 13A;

FIG. 13K is a sectional side elevation of the sealing member retainer illustrated in FIG. 13J taken along lines E-E;

FIG. 13L is a front elevation view of a centralizer of the fluid conductor module illustrated in FIG. 13A; and FIG. 13M is a side elevation of the centralizer illustrated in FIG. 13L.

DETAILED DESCRIPTION

As used herein, the terms "up", "upward", "upper", or "uphole", mean, relativistically, in closer proximity to the surface 106 and further away from the bottom of the wellbore, when measured along the longitudinal axis of the wellbore 102. The terms "down", "downward", "lower", or "downhole" mean, relativistically, further away from the surface 106 and in closer proximity to the bottom of the wellbore 102, when measured along the longitudinal axis of the wellbore 102.

Figure 1:
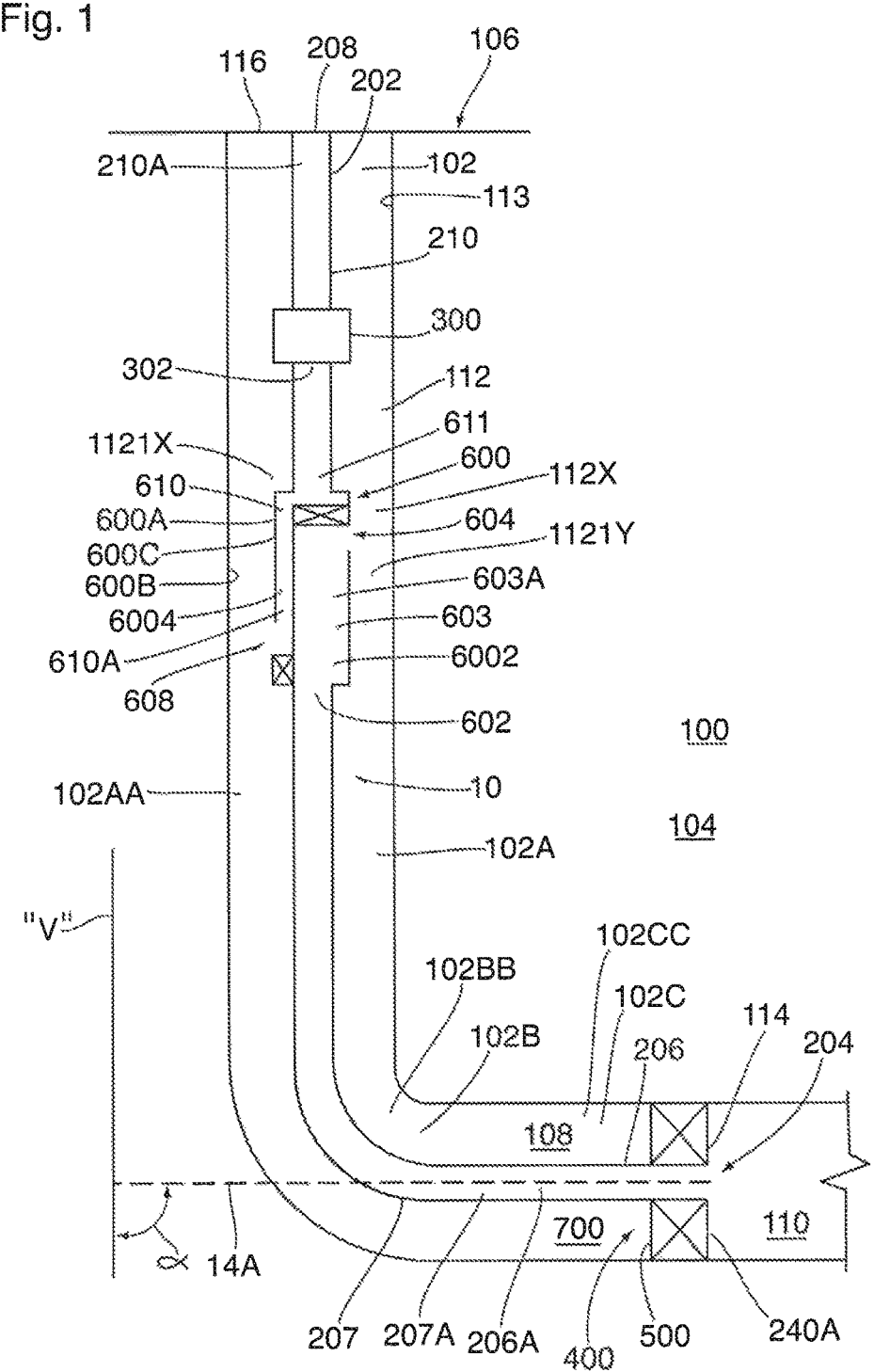
FIG. 1 is a schematic illustration of an embodiment of a system including a reservoir fluid production assembly disposed within a wellbore.
Figure 2:
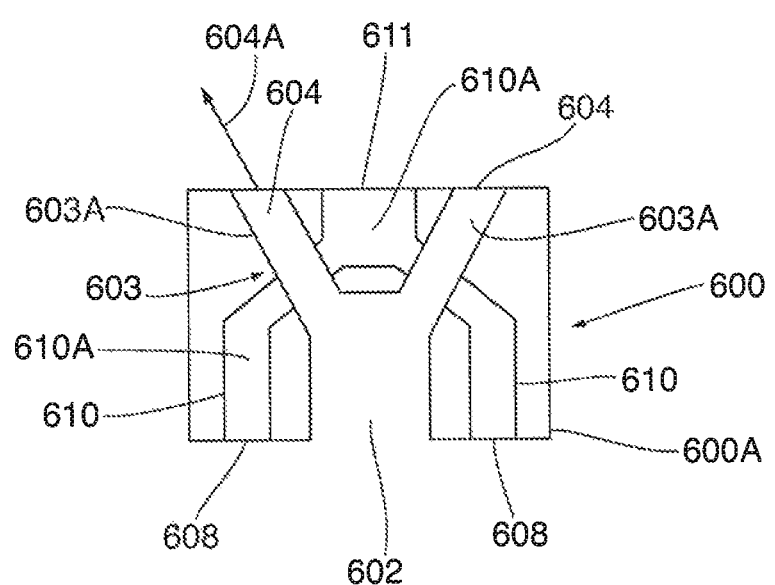
FIG. 2 is a schematic illustration of a an embodiment of a flow diverter of a reservoir fluid production assembly.

Referring to FIGS. 1 and 2, there are provided systems 8, with associated apparatuses, for producing hydrocarbons from a reservoir, such as an oil reservoir, within a subterranean formation 100, when reservoir pressure within the oil reservoir is insufficient to conduct hydrocarbons to the surface 106 through a wellbore 102.

The wellbore 102 can be straight, curved, or branched. The wellbore 102 can have various wellbore portions. A wellbore portion is an axial length of a wellbore 102. A wellbore portion can be characterized as "vertical" or "horizontal" even though the actual axial orientation can vary from true vertical or true horizontal, and even though the axial path can tend to "corkscrew" or otherwise vary. The term "horizontal", when used to describe a wellbore portion, refers to a horizontal or highly deviated wellbore portion as understood in the art, such as, for example, a wellbore portion having a longitudinal axis that is between about 70 and about 110 degrees from vertical. The term "vertical", when used to describe a wellbore portion, refers to a vertical or highly deviated vertical portion as understood in the art, such as, for example, a wellbore portion having a longitudinal axis that is less than about 20 degrees from the vertical.

"Reservoir fluid" is fluid that is contained within an oil reservoir. Reservoir fluid may be liquid material, gaseous material, or a mixture of liquid material and gaseous material. In some embodiments, for example, the reservoir fluid includes water and hydrocarbons, such as oil, natural gas condensates, or any combination thereof.

Fluids may be injected into the oil reservoir through the wellbore to effect stimulation of the reservoir fluid. For example, such fluid injection is effected during hydraulic fracturing, water flooding, water disposal, gas floods, gas disposal (including carbon dioxide sequestration), steam-assisted gravity drainage ("SAGD") or cyclic steam stimulation ("CS S"). In some embodiments, for example, the same wellbore is utilized for both stimulation and production operations, such as for hydraulically fractured formations or for formations subjected to CSS. In some embodiments, for example, different wellbores are used, such as for formations subjected to SAGD, or formations subjected to waterflooding.

A wellbore string 113 is employed within the wellbore 102 for stabilizing the subterranean formation 100. In some embodiments, for example, the wellbore string 113 also contributes to effecting fluidic isolation of one zone within the subterranean formation 100 from another zone within the subterranean formation 100.

The fluid productive portion of the wellbore 102 may be completed either as a cased-hole completion or an open-hole completion.

A cased-hole completion involves running wellbore casing down into the wellbore through the production zone. In this respect, in the cased-hole completion, the wellbore string 113 includes wellbore casing.

The annular region between the deployed wellbore casing and the oil reservoir may be filled with cement for effecting zonal isolation (see below). The cement is disposed between the wellbore casing and the oil reservoir for the purpose of effecting isolation, or substantial isolation, of one or more zones of the oil reservoir from fluids disposed in another zone of the oil reservoir. Such fluids include reservoir fluid being produced from another zone of the oil reservoir (in some embodiments, for example, such reservoir fluid being flowed through a production tubing string disposed within and extending through the wellbore casing to the surface), or injected fluids such as water, gas (including carbon dioxide), or stimulations fluids such as fracturing fluid or acid. In this respect, in some embodiments, for example, the cement is provided for effecting sealing, or substantial sealing, of flow communication between one or more zones of the oil reservoir and one or more others zones of the oil reservoir (for example, such as a zone that is being produced). By effecting the sealing, or substantial sealing, of such flow communication, isolation, or substantial isolation, of one or more zones of the oil reservoir, from another subterranean zone (such as a producing formation), is achieved. Such isolation or substantial isolation is desirable, for example, for mitigating contamination of a water table within the oil reservoir by the reservoir fluid (e.g. oil, gas, salt water, or combinations thereof) being produced, or the above-described injected fluids.

In some embodiments, for example, the cement is disposed as a sheath within an annular region between the wellbore casing and the oil reservoir. In some embodiments, for example, the cement is bonded to both of the production casing and the oil reservoir.

In some embodiments, for example, the cement also provides one or more of the following functions: (a) strengthens and reinforces the structural integrity of the wellbore, (b) prevents, or substantially prevents, produced reservoir fluid of one zone from being diluted by water from other zones. (c) mitigates corrosion of the wellbore casing, (d) at least contributes to the support of the wellbore casing, and e) allows for segmentation for stimulation and fluid inflow control purposes.

The cement is introduced to an annular region between the wellbore casing and the oil reservoir after the subject wellbore casing has been run into the wellbore. This operation is known as "cementing".

In some embodiments, for example, the wellbore casing includes one or more casing strings, each of which is positioned within the well bore, having one end extending from the well head. In some embodiments, for example, each casing string is defined by jointed segments of pipe. The jointed segments of pipe typically have threaded connections.

Typically, a wellbore contains multiple intervals of concentric casing strings, successively deployed within the previously run casing. With the exception of a liner string, casing strings typically run back up to the surface 106. Typically, casing string sizes are intentionally minimized to minimize costs during well construction. Generally, smaller casing sizes make production and artificial lofting more challenging.

For wells that are used for producing reservoir fluid, few of these actually produce through wellbore casing. This is because producing fluids can corrode steel or form undesirable deposits (for example, scales, asphaltenes or paraffin waxes) and the larger diameter can make flow unstable. In this respect, a production string is usually installed inside the last casing string. The production string is provided to conduct reservoir fluid, received within the wellbore, to the wellhead 116. In some embodiments, for example. the annular region between the last casing string and the production tubing string may be sealed at the bottom by a packer.

To facilitate flow communication between the reservoir and the wellbore, the wellbore casing may be perforated, or otherwise include per-existing ports (which may be selectively openable, such as, for example, by shifting a sleeve), to provide a fluid passage for enabling flow of reservoir fluid from the reservoir to the wellbore.

In some embodiments, for example, the wellbore casing is set short of total depth. Hanging off from the bottom of the wellbore casing, with a liner hanger or packer, is a liner string. The liner string can be made from the same material as the casing string, but, unlike the casing string, the liner string does not extend back to the wellhead 116. Cement may be provided within the annular region between the liner string and the oil reservoir for effecting zonal isolation (see below), but is not in all cases. In some embodiments, for example, this liner is perforated to effect flow communication between the reservoir and the wellbore. In this respect, in some embodiments, for example, the liner string can also be a screen or is slotted. In some embodiments, for example, the production tubing string may be engaged or stung into the liner string, thereby providing a fluid passage for conducting the produced reservoir fluid to the wellhead 116. In some embodiments, for example, no cemented liner is installed, and this is called an open hole completion or uncemented casing completion.

An open-hole completion is effected by drilling down to the top of the producing formation, and then lining the wellbore (such as, for example, with a wellbore string 113). The wellbore is then drilled through the producing formation, and the bottom of the wellbore is left open (i.e. uncased), to effect flow communication between the reservoir and the wellbore. Open-hole completion techniques include bare foot completions, pre-drilled and pre-slotted liners, and open-hole sand control techniques such as stand-alone screens, open hole gravel packs and open hole expandable screens. Packers and casing can segment the open hole into separate intervals and ported subs can be used to effect flow communication between the reservoir and the wellbore.

Referring to FIGS. 1 and 2, an assembly 10 is provided for effecting production of reservoir fluid from the reservoir 104 of the subterranean formation 100.

In some embodiments, for example, a wellbore fluid conductor 113, such as, for example, the wellbore string 113 (such as, for example, the casing 113), is disposed within the wellbore 102. The assembly 10 is configured for disposition within the wellbore fluid conductor 113, such that an intermediate wellbore passage 112 is defined within the wellbore fluid conductor 113, between the assembly 10 and the wellbore fluid conductor 113. In some embodiments, for example, the intermediate wellbore passage 112 is an annular space disposed between the assembly 10 and the wellbore string 113. In some embodiments, for example, the intermediate wellbore passage 112 is defined by the space that extends outwardly, relative to the central longitudinal axis of the assembly 10, from the assembly 10 to the wellbore fluid conductor 113. In some embodiments, for example, the intermediate wellbore passage 112 extends longitudinally to the wellhead 116, between the assembly 10 and the wellbore string 113.

The assembly 10 includes a production string 202 that is disposed within the wellbore 102. The production string 202 includes a pump 300

The pump 300 is provided to, through mechanical action, pressurize and effect conduction of the reservoir fluid from the reservoir 104, through the wellbore 102, and to the surface 106, and thereby effect production of the reservoir fluid. It is understood that the reservoir fluid being conducted uphole through the wellbore 102, via the production string 202, may be additionally energized by supplemental means, including by gas-lift. In some embodiments, for example, the pump 300 is a sucker rod pump. Other suitable pumps 300 include screw pumps, electrical submersible pumps, and jet pumps.

The system also includes a flow diverter 600. The flow diverter 600 is provided for, amongst other things, mitigating gas lock within the pump 300. In some embodiments, for example, the flow diverter 600 is disposed within a vertical portion of the wellbore 102 that extends to the surface 106.

In some embodiments, the flow diverter 600 includes a wellbore string counterpart 600B and an assembly counterpart 600C. The wellbore string 113 defines the wellbore string counterpart 600B, and the assembly 10 defines the assembly counterpart 600C. The flow diverter 600 defines: (i) a reservoir fluid-conducting passage 6002 for diverted reservoir fluid, received within the downhole wellbore space from the reservoir 104, to a reservoir fluid separation space 112X of the wellbore 102, with effect that a gas-depleted reservoir fluid is separated from the reservoir fluid within the reservoir fluid separation space 112X in response to at least buoyancy forces; and (ii) a gas-depleted reservoir fluid-conducting passage 6004 for receiving the separated gas-depleted reservoir fluid while the separated gas-depleted reservoir fluid is flowing in a downhole direction, and diverting the flow of the received gas-depleted reservoir fluid such that the received gas-depleted reservoir fluid is conducted by the flow diverter 600 in the uphole direction to the pump 300.

As discussed above, the wellbore 102 is disposed in flow communication (such as through perforations provided within the installed casing or liner, or by virtue of the open hole configuration of the completion), or is selectively disposable into flow communication (such as by perforating the installed casing, or by actuating a valve to effect opening of a port), with the reservoir 104. When disposed in flow communication with the reservoir 104, the wellbore 102 is disposed for receiving reservoir fluid flow from the reservoir 104.

The production string inlet 204 is for receiving, via the wellbore, the reservoir fluid flow from the reservoir. In this respect, the reservoir fluid flow enters the wellbore 102, as described above, and is then conducted to the production string inlet 204. The production string 202 includes a reservoir fluid-supplying conductor 206, disposed downhole relative to the flow diverter 600 for conducting the reservoir fluid (such as a reservoir fluid flow), that is being received by the production string inlet, such that the reservoir fluid, that is received by the inlet 204, is conducted to the flow diverter 600 via the fluid-supplying conductor 206. The production string 202 also includes a gas-depleted reservoir fluid-producing conductor 210, disposed uphole relative to the flow diverter 600 for conducting a gas-depleted reservoir fluid (such as a gas-depleted reservoir fluid flow) from the flow diverter 600 to a production string outlet 208, located at the wellhead 116.

It is preferable to remove at least a fraction of the gaseous material from the reservoir fluid flow being conducted within the production string 202, prior to the pump suction 302, in order to mitigate gas interference or gas lock conditions during pump operation. The flow diverter 600, is provided to, amongst other things, perform this function. In this respect, the flow diverter 600 is disposed downhole relative to the pump 300 and is fluidly coupled to the pump suction 302, such as, for example, by an intermediate fluid conductor that forms part of the fluid-producing conductor 210, such as piping. Suitable exemplary flow diverters are described in International Application No. PCT/CA2015/000178, published on Oct. 1, 2015.

In some embodiments, for example, the assembly counterpart 600C includes a fluid diverter body 600A.

In some embodiments, for example, the flow diverter body 600A is configured such that the depletion of gaseous material from the reservoir fluid material, that is effected while the assembly 10 is disposed within the wellbore 102, is effected externally of the flow diverter body 600A within the wellbore 102, such as, for example, within an uphole wellbore space 108 of the wellbore 102.

The flow diverter body 600A includes a reservoir fluid receiver 602 for receiving the reservoir fluid (such as, for example, in the form of a reservoir fluid flow) that is being conducted (e.g. flowed), via the fluid-supplying conductor 206 of the production string 202, from the production string inlet 204. In some embodiments, for example, the fluid-supplying conductor 206 extends from the inlet 204 to the receiver 602. In this respect, the fluid-supplying conductor 206 is fluidly coupled to the inlet 204.

The flow diverter body 600A also includes a reservoir fluid discharge communicator 604 that is fluidly coupled to the reservoir fluid receiver 602 via a reservoir fluid-conductor 603. In this respect, the reservoir fluid conductor 603 defines at least a portion of the reservoir fluid-conducting passage 6002.

The reservoir fluid conductor 603 defines one or more reservoir fluid conductor passages 603A. In some of the embodiments described below, for example, the one or more reservoir fluid-conducting passages 603A. The reservoir fluid discharge communicator 604 is configured for discharging reservoir fluid (such as, for example, in the form of a flow) that is received by the reservoir fluid receiver 602 and conducted to the reservoir fluid discharge communicator 604 via the reservoir fluid conductor 603. In some embodiments, for example, the reservoir fluid discharge communicator 604 is disposed at an opposite end of the flow diverter body 600A relative to the reservoir fluid receiver 602.

The flow diverter body 600A also includes a gas-depleted reservoir fluid receiver 608 for receiving a gas-depleted reservoir fluid (such as, for example, in the form of a flow), after gaseous material has been separated from the reservoir fluid (for example, a reservoir fluid flow), that has been discharged from the reservoir fluid discharge communicator 604, in response to at least buoyancy forces. In this respect, the gas-depleted reservoir fluid receiver 608 and the reservoir fluid discharge communicator 604 are co-operatively configured such that the gas-depleted reservoir fluid receiver 608 is disposed for receiving a gas-depleted reservoir fluid flow, after gaseous material has been separated from the received reservoir fluid flow that has been discharged from the reservoir fluid discharge communicator 604, in response to at least buoyancy forces. In some embodiments, for example, the reservoir fluid discharge communicator 604 is disposed at an opposite end of the flow diverter body 600A relative to the gas-depleted reservoir fluid receiver 608.

The flow diverter body 600A also includes a gas-depleted reservoir fluid conductor 610 that defines a gas-depleted reservoir fluid-conducting passage 610A configured for conducting the gas-depleted reservoir fluid (for example, a gas-depleted reservoir fluid flow), received by the receiver 608, to the gas-depleted reservoir fluid discharge communicator 604. In some embodiments, for example, the gas-depleted reservoir fluid discharge communicator 611 is disposed at an opposite end of the flow diverter body 600A relative to the gas-depleted reservoir fluid receiver 608. The gas-depleted reservoir fluid discharge communicator 611 is configured for fluid coupling to the pump 300, wherein the fluid coupling is for supplying the pump 300 with the gas-depleted reservoir fluid received by the receiver 610 and conducted through at least the gas-depleted reservoir fluid conductor 610. In this respect, the gas-depleted reservoir fluid-conducting passage 610A defines at least a portion of the gas-depleted reservoir fluid-conducting passage 6004.

Referring to FIG. 2, in some embodiments, for example, the reservoir fluid discharge communicator 604 is oriented such that, a ray (see, for example ray 604A), that is disposed along the central longitudinal axis of the reservoir fluid discharge communicator, is disposed in an uphole direction at an acute angle of less than 30 degrees relative to the central longitudinal axis of the wellbore portion within which the flow diverter body 600A is disposed.

Again referring to FIG. 2, in some embodiments, for example, the reservoir fluid discharge communicator 604 is oriented such that, a ray (see, for example ray 604A), that is disposed along the central longitudinal axis of the reservoir fluid discharge communicator 604, is disposed in an uphole direction at an acute angle of less than 30 degrees relative to the vertical (which includes disposition of the ray 604A along a vertical axis).

In some embodiments, for example, the flow diverter body 600A includes the reservoir fluid receiver 602 (such as, for example, in the form of one or more ports), the reservoir fluid discharge communicator 604 (such as, for example, in the form of one or more ports), and the reservoir fluid conductor 603 (such as, for example, in the form of one or more fluid passages 603A, such as, for example, a network of fluid) for fluidly coupling the receiver 602 and the discharge communicator 604. The flow diverter body 600A also includes the gas-depleted reservoir fluid receiver 608 (such as, for example, in the form of one or more ports), gas-depleted reservoir fluid discharge communicator 611 (such as, for example, in the form of one or more ports), and the gas-depleted reservoir fluid conductor 610 (such as, for example, in the form of a fluid passage or a network of fluid passages) for fluidly coupling the receiver 608 to the discharge communicator 611.

The assembly counterpart 600C also includes a wellbore sealed interface effector 400 configured for interacting with a wellbore feature for defining a wellbore sealed interface 500 within the wellbore 102, between: (a) an uphole wellbore space 108 of the wellbore 102, and (b) a downhole wellbore space 110 of the wellbore 102, while the assembly 10 is disposed within the wellbore 102.

In some embodiments, for example, the disposition of the sealed interface 500 is such that flow communication, via the intermediate wellbore passage 112, between an uphole wellbore space 108 and a downhole wellbore space 110 (and across the sealed interface 500), is prevented, or substantially prevented. In some embodiments, for example, the disposition of the sealed interface 500 is such that fluid flow, across the sealed interface 500, in a downhole direction, from the uphole wellbore space 108 to the downhole wellbore space 110, is prevented, or substantially prevented.

In such embodiments, for example, the disposition of the sealed interface 500 is effected by the combination of at least: (i) a sealed, or substantially sealed, disposition of the wellbore string 113 relative to a polished bore receptacle 114 (such as that effected by a packer 240A disposed between the wellbore string 113 and the polished bore receptacle 114), and (ii) a sealed, or substantially sealed, disposition of the fluid-supplying conductor 206 relative to the polished bore receptacle 114. In this respect, the sealed interface 500 functions to prevent, or substantially prevented, reservoir fluid flow, that is received within the wellbore 102 (that is lined with the wellbore string 113), from bypassing the reservoir fluid receiver 602, and, as a corollary, the reservoir fluid is directed to the reservoir fluid receiver 602 for receiving by the reservoir fluid receiver 602. As well, the sealed interface 500 functions to prevent, or substantially prevented, gas-depleted reservoir fluid flow, that has been separated from the reservoir fluid discharged into the wellbore 102 from the discharge communicator 604, from bypassing the gas-depleted reservoir fluid receiver 608 and, as a corollary, the gas-depleted reservoir fluid is directed to the gas-depleted reservoir fluid receiver 608 for receiving by the gas-depleted reservoir fluid receiver 608.

In some embodiments, for example, the sealed, or substantially sealed, disposition of the fluid-supplying conductor 206 relative to the polished bore receptacle 114 is effected by a latch seal assembly. A suitable latch seal assembly is a Weatherford™ Thread-Latch Anchor Seal Assembly™.

In some embodiments, for example, the sealed, or substantially sealed, disposition of the downhole fluid-supplying conductor 206 relative to the polished bore receptacle 114 is effected by one or more o-rings or seal-type Chevron rings. In this respect, the sealing interface effector 400 includes the o-rings, or includes the seal-type Chevron rings.

In some embodiments, for example, the sealed, or substantially sealed, disposition of the fluid-supplying conductor 206 relative to the polished bore receptacle 114 is disposed in an interference fit with the polished bore receptacle. In some of these embodiments, for example, the fluid-supplying conductor 206 is landed or engaged or "stung" within the polished bore receptacle 114.

The above-described disposition of the wellbore sealed interface 500 provide for conditions which minimize solid debris accumulation in the joint between the downhole fluid-supplying conductor 206 and the polished bore receptacle 114 or in the joint between the polished bore receptacle 114 and the wellbore string 113. By providing for conditions which minimize solid debris accumulation within the joint, interference to movement of the separator relative to the liner, or the casing, as the case may be, which could be effected by accumulated solid debris, is mitigated.

Referring to FIG. 1, in some embodiments, for example, the sealed interface 500 is disposed within a section of the wellbore 102 whose axis 14A is disposed at an angle "α" of at least 60 degrees relative to the vertical "V". In some of these embodiments, for example, the sealed interface 500 is disposed within a section of the wellbore whose axis is disposed at an angle "α" of at least 85 degrees relative to the vertical "V". In this respect, disposing the sealed interface 500 within a wellbore section having such wellbore inclinations minimizes solid debris accumulation at the sealed interface 500.

In some embodiments, for example, the flow diverter body 600, the sealed interface effector 400, and the reservoir fluid conductor 206, are co-operatively configured such that, while the assembly 10 is disposed within the wellbore string 113 such that the sealed interface 500 is defined, and the reservoir fluid-supplying conductor 206 is receiving reservoir fluid from the downhole wellbore space 110 that has been received within the downhole wellbore space 110 from the subterranean formation 100: the reservoir fluid is conducted to the reservoir fluid receiver 602 via the reservoir fluid-supplying conductor 206; the reservoir fluid is conducted to the reservoir fluid discharge communicator 604 by the reservoir fluid conductor 603 and discharged to the reservoir fluid separation space 112X of the uphole wellbore space 108; within the reservoir fluid separation space 112X, a gas-depleted reservoir fluid is separated from the discharged reservoir fluid, in response to at least buoyancy forces, such that the gas-depleted reservoir fluid is obtained; the separated gas-depleted reservoir fluid is conducted to the gas-depleted reservoir fluid receiver 608 via the intermediate wellbore passage 112, and the received gas-depleted reservoir fluid is conducted from the gas-depleted reservoir fluid receiver 608 to the pump 300 via at least the conductor 610 and the gas-depleted reservoir fluid discharge communicator 611.

In this respect, in such embodiments, for example, at least a portion of the space within the intermediate wellbore space 112, between the reservoir fluid discharge communicator 604 and the gas-depleted reservoir fluid receiver 608, defines at least a portion of the gas-depleted reservoir fluid-conducting passage 6004.

Once received by the pump 300, the gas-depleted reservoir fluid is pressurized by the pump 300 and conducted to the surface via the reservoir fluid-producing conductor 210.

Also, the separation of gaseous material from the reservoir fluid is with effect that a liquid-depleted reservoir fluid is obtained and is conducted uphole (in the gaseous phase, or at least primarily in the gaseous phase with relatively small amounts of entrained liquid) via the intermediate wellbore passage 112 that is disposed between the assembly 10 and the wellbore string 113 (see above).

The reservoir fluid produced from the subterranean formation 100, via the wellbore 102, including the gas-depleted reservoir fluid, the liquid-depleted reservoir material, or both, may be discharged through the wellhead 116 to a collection facility, such as a storage tank within a battery.

In some embodiments, for example, the flow diverter body 600A is configured such that the gas-depleted reservoir fluid receiver 608 is disposed downhole relative to (such as, for example, vertically below) the reservoir fluid discharge communicator 604, with effect that the separated gas-depleted reservoir fluid is conducted in a downhole direction to the gas-depleted reservoir fluid receiver 608.

In some embodiments, for example, separation of gaseous material, from the reservoir fluid that is being discharged from the reservoir fluid discharge communicator 604, is effected within an uphole-disposed space 1121X of the intermediate wellbore passage 112, the uphole-disposed space 1121X being disposed uphole relative to the reservoir fluid discharge communicator 604. In this respect, in some embodiments, for example, the reservoir fluid separation space 112X includes the uphole-disposed space 1121X.

In some embodiments, for example, a flow diverter body-defined intermediate wellbore passage portion 1121Y of the intermediate wellbore passage 112 is disposed within a space between the flow diverter body 600A and the wellbore string 113, and effects flow communication between the reservoir fluid discharge communicator 604 and the gas-depleted reservoir fluid receiver 608 for effecting conducting of the gas-depleted reservoir fluid to the gas-depleted reservoir fluid receiver 608. In this respect, in such embodiments, for example, the flow diverter body-defined intermediate wellbore passage portion 1121Y defines at least a portion of the gas-depleted reservoir fluid-conducting passage 6004.

In some embodiments, for example, the space between the flow diverter body 600A and the wellbore string 113, within which the flow diverter body-defined intermediate wellbore passage portion 1121Y is disposed, is an annular space. In some embodiments, for example, the flow diverter body-defined intermediate space 1121Y is defined by the entirety, or the substantial entirety, of the space between the flow diverter body 600A and the wellbore string 113. In some embodiments, for example, separation of gaseous material, from the reservoir fluid that is discharged from the reservoir fluid discharge communicator 604, is effected within the flow diverter body-defined intermediate wellbore passage portion 1121Y. In this respect, in some embodiments, for example, at least a portion of the reservoir fluid separation space 112X is co-located with at least a portion of the flow diverter body-defined intermediate wellbore passage portion 1121Y.

In some embodiments, for example, the separation of gaseous material, from the reservoir fluid that is being discharged from the reservoir fluid discharge communicator 604, is effected within both of the uphole-disposed space 1121X and the flow diverter body-defined intermediate wellbore passage portion 1121Y. In this respect, in some embodiments, for example, the reservoir fluid is discharged from the reservoir fluid discharge communicator 604 into the uphole wellbore space 1121X, and, in response to at least buoyancy forces, the gaseous material is separated from the discharged reservoir fluid, while the reservoir fluid is being conducted downhole, from the uphole-disposed space 1121X, through the flow diverter body-defined intermediate wellbore passage portion 1121Y, and to the gas-depleted reservoir fluid receiver 608. In this respect, in some embodiments, for example, the uphole-disposed space 1121X is merged with the flow diverter body-defined intermediate wellbore passage portion 1121Y

In some embodiments, for example, the reservoir fluid separation space 112X spans a continuous space extending from the assembly to the wellbore string 113, and the continuous space extends outwardly relative to the central longitudinal axis of the assembly 10.

In some embodiments, for example, the reservoir fluid separation space 112X spans a continuous space extending from the assembly to the wellbore string 113, and the continuous space extends outwardly relative to the central longitudinal axis of the wellbore 102.

In some embodiments, for example, the reservoir fluid separation space 112X is disposed within a vertical portion of the wellbore 102 that extends to the surface 106.

In some embodiments, for example, the ratio of the minimum cross-sectional flow area of the reservoir fluid separation space 112X to the maximum cross-sectional flow area of the fluid passage 206A defined by the reservoir fluid-supplying conductor 206 is at least about 1.5.

In some embodiments, for example, the space, between: (a) the gas-depleted reservoir fluid receiver 608 of the flow diverter body 600A, and (b) the sealed interface 500, defines a sump 700 for collection of solid particulate that is entrained within fluid being discharged from the reservoir fluid discharge communicator 604 of the flow diverter body 600A, and the sump 700 has a volume of at least 0.1 m$^3$. In some embodiments, for example, the volume is at least 0.5 m$^3$. In some embodiments, for example, the volume is at least 1.0 m$^3$. In some embodiments, for example, the volume is at least 3.0 m$^3$.

By providing for the sump 700 having the above-described volumetric space characteristic, and/or the above-described minimum separation distance characteristic, a suitable space is provided for collecting relative large volumes of solid debris, from the gas-depleted reservoir fluid being flowed downwardly to the gas-depleted reservoir fluid receiver 608, such that interference by the accumulated solid debris with the production of oil through the system is mitigated. This increases the run-time of the system before any maintenance is required. As well, because the solid debris is deposited over a larger area, the propensity for the collected solid debris to interfere with movement of the flow diverter body 600A within the wellbore 102, such as during maintenance (for example, a workover) is reduced.

As above-described, the reservoir fluid-producing conductor 210 extends from the gas-depleted reservoir fluid discharge communicator 611 to the wellhead 116 for effecting flow communication between the discharge communicator 611 and the earth's surface 106, such as, for example, a collection facility located at the earth's surface 106, and defines a fluid passage 210A. In some embodiments, for example, reservoir fluid-supplying conductor 206 defines a fluid passage 206A. The cross-sectional flow area of the fluid passage 210A is greater than the cross-sectional flow area of the fluid passage 206A. In some embodiments, for example, the ratio of the cross-sectional flow area of the fluid passage 210A to the cross-sectional flow area of the fluid passage 206A is at least 1.1, such as, for example, at least 1.25, such as, for example, at least 1.5.

In some embodiments, for example, the reservoir fluid-supplying conductor 206 includes a velocity string 207, and, in some embodiments, for example, the entirety, or the substantial entirety of the reservoir fluid-supplying conductor 206 is a velocity string 207. In some embodiments, for example, the velocity string 207 extends from the production string inlet 204. In some embodiments, for example, at least 25% of the length of the fluid-supplying conductor 206, as measured along the central longitudinal axis of the fluid-supplying conductor 206, is a velocity string 207. In some embodiments, for example, the length of the velocity string 207, measured along the central longitudinal axis of the velocity string, is at least 20 feet. In some embodiments, for example, the velocity string 207 includes a fluid passage 207A, and the cross-sectional area of the entirety of the fluid passage 207A is less than the cross-sectional area of the entirety of the fluid passage 210A of the fluid-producing conductor 210. In this respect, in some embodiments, for example, the maximum cross-sectional area of the fluid passage 207A is less than the minimum cross-sectional area of the fluid passage 210A. In some embodiments, for example, the maximum cross-sectional area of the fluid passage 207A is less than about 75% (such as, for example 50%) of the minimum cross-sectional area of at least 75% (such as, for example, at least 80%, such as, for example, at least 85%, such as, for example, at least 90%, such as, for example, at least 95%) of the length of the fluid-supplying conductor 206, as measured along the central longitudinal axis of the fluid-supplying conductor 206. In some embodiments, for example, the length of the fluid-supplying conductor 206, as measured along the central longitudinal axis of the fluid-supplying conductor 206, is at least 500 feet, such as, for example, at least 750 feet, such as, for example at least 1000 feet.

In some embodiments, for example, the flow diverter 600 is disposed uphole of a horizontal section 102C of the wellbore 102, such as, in some embodiments, for example, within a vertical section 102A, or, in some embodiments, for example, within a transition section 102B.

In some embodiments, for example, the central longitudinal axis of the passage 102CC of the horizontal section 102C is disposed along an axis that is between about 70 and about 110 degrees relative to the vertical "V", the central longitudinal axis of the passage 102AA of the vertical section 102A is disposed along an axis that is less than about 20 degrees from the vertical "V", and the transition section 102B is disposed between the sections 102A and 102C. In some embodiments, for example, the transition section 102B joins the sections 102A and 102C. In some embodiments, for example, the vertical section 102A extends from the transition section 102B to the surface 106.

In some of these embodiments, for example, the reservoir fluid-supplying conductor 206 extends from the flow diverter 600, in a downhole direction, into the horizontal section 102C, such that the inlet 204 is disposed within the horizontal section 102C.

Figure 3:
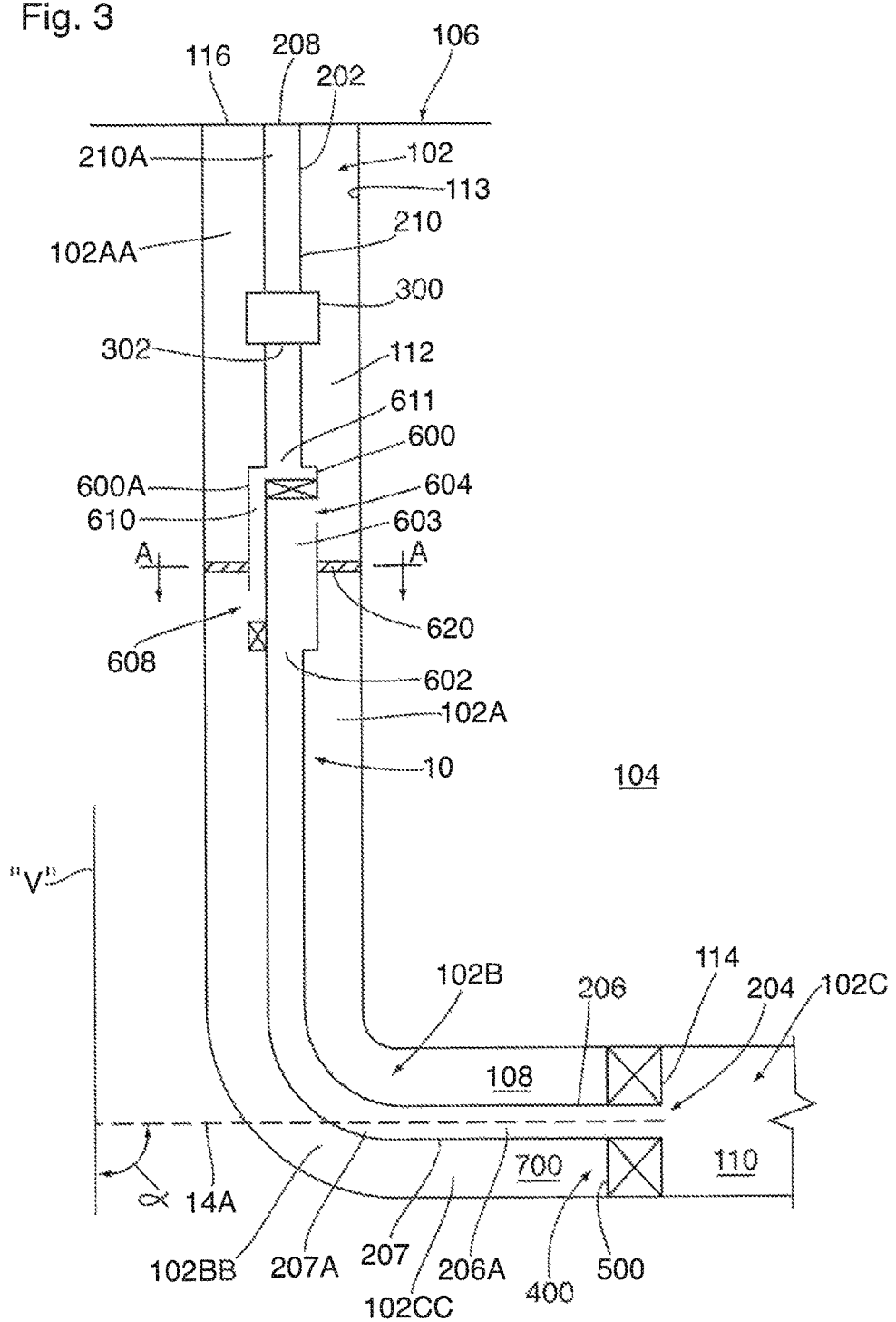
FIG. 3 is a schematic illustration of another embodiment of a system including a reservoir fluid production assembly, similar to the embodiment in FIG. 1, and additionally including an anchor.
Figure 4:
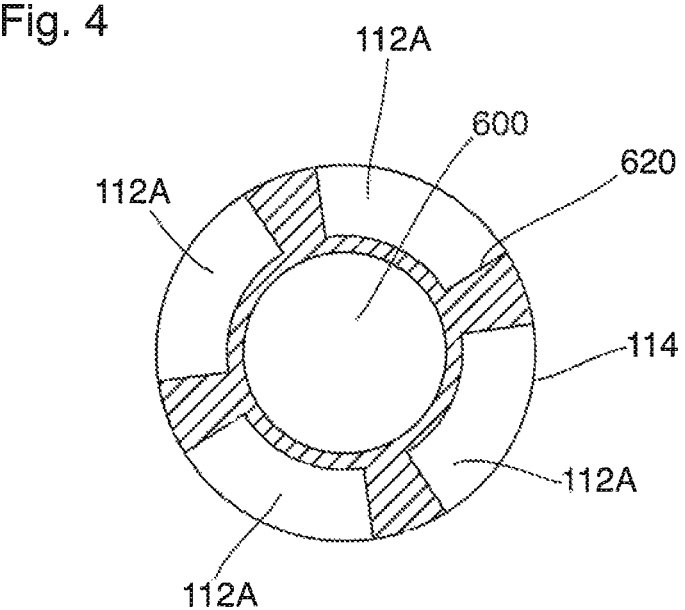
FIG. 4 is a schematic illustration of an anchor of the system illustrated in FIG. 3.

Referring to FIGS. 3 and 4, an anchor 620 is mounted to the flow diverter 600 for effecting coupling (such as, for example, anchoring) of the assembly 10 to the wellbore string. In some embodiments, for example, the anchor 620 is an industry standard tubing anchor.

In some embodiments, for example, the anchor 620 is disposed such that there is an absence, or substantial absence, of opposition to flow of a gaseous material, that has been separated from the reservoir fluid within the reservoir fluid separation space 112X in response to at least buoyancy forces, by the anchor 620.

In some embodiments, for example, the anchor 620 is disposed such that fluid communication, via one or more flowpaths 112A defined between the anchor 620 and the wellbore fluid conductor 114 (see FIG. 3) is defined between the reservoir fluid discharge communicator 604 and the gas-depleted reservoir fluid inlet port 608.

Figure 5:
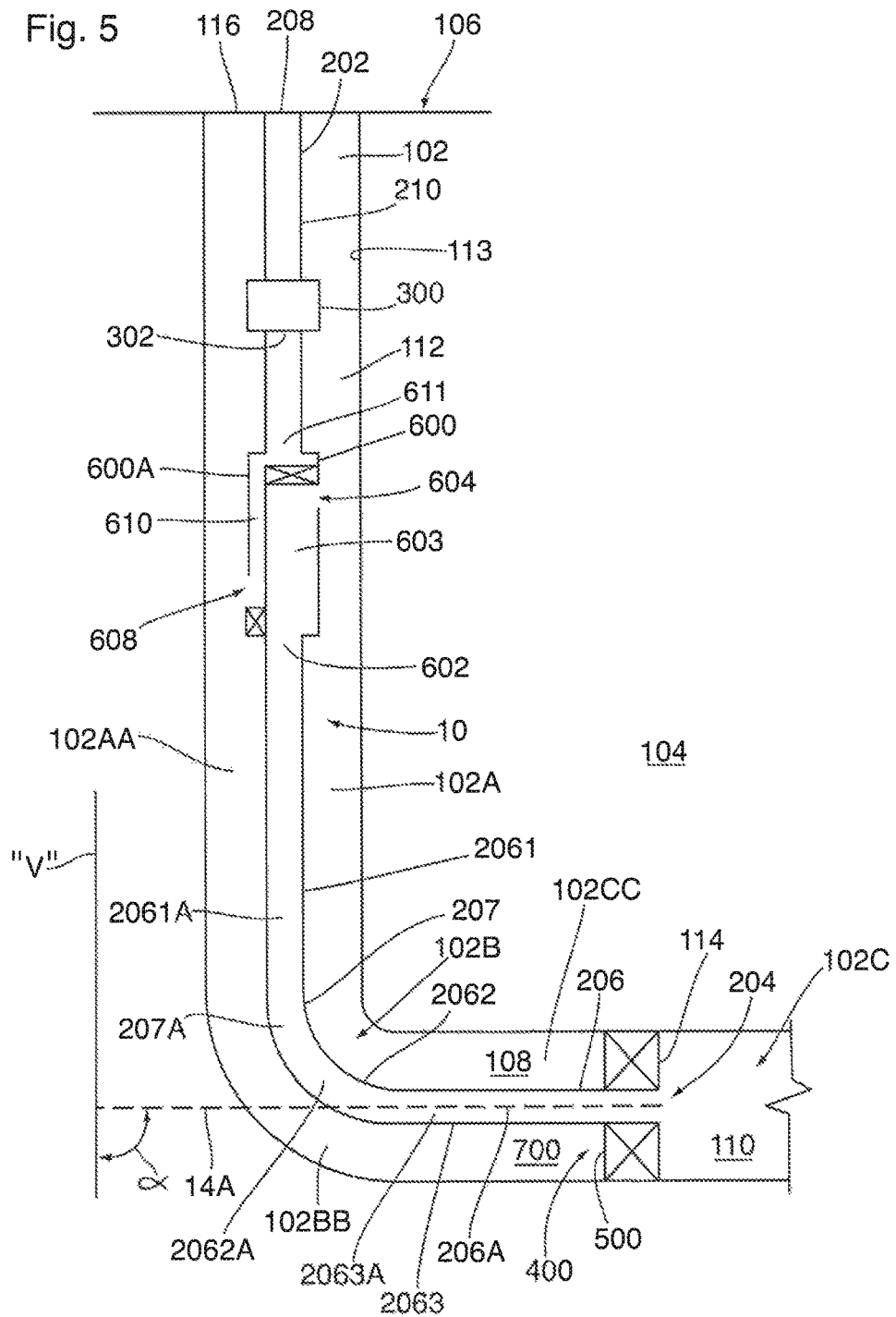
FIG. 5 is a schematic illustration of another embodiment of a system including a reservoir fluid production assembly disposed within a wellbore, similar to the system illustrated in FIG. 1, and having a reservoir fluid-supplying conductor who cross-sectional flow area is variable along its central longitudinal axis.

Reservoir fluid that is being conducted through the transition section 102B is particularly susceptible to liquid loading because of the change in direction, to the reservoir fluid being conducted through the transition section 102B, that is urged by virtue of the configuration of transition section 102B. To mitigate liquid loading, the reservoir fluid-supplying conductor 206 is configured such that the reservoir fluid is being conducted through the transition section 102B at a sufficiently high speed. In this respect, and referring to FIG. 5, the reservoir fluid-supplying conductor 206 includes a vertical section-disposed portion 2061, that is disposed in the vertical section 102A, a transition section-disposed portion 2062, that is disposed in the transition section 102B, and a horizontal-section disposed portion 2063, that is disposed in the horizontal section 102C, A cross-sectional area of the fluid passage 2062A of the transition section-disposed portion 2062 is less than both of: (i) a cross-sectional area of the fluid passage 2061A of the vertical section-disposed portion 2061, and (ii) a cross-sectional area of the fluid passage 2063A of the horizontal section-disposed portion 2063. In some embodiments, for example, the central longitudinal axis of the fluid passage 2063A of the horizontal section-disposed portion 2063 is disposed along an axis that is between about 70 and about 110 degrees relative to the vertical "V", the central longitudinal axis of the fluid passage 2063A of the vertical section-disposed portion 2063 is disposed along an axis that is less than about 20 degrees from the vertical "V", and the transition-section disposed portion 2062 is disposed between the portions 2061 and 2063. In some embodiments, for example, the transition-section disposed portion 2062 joins the portions 2061 and 2063. In some embodiments, for example, the vertical section-disposed portion 2061 extends from the transition section-disposed portion 2062 to the surface 106.

In some embodiments, for example, the ratio of the minimum cross-sectional area of the fluid passage 2063A of the horizontal section-disposed portion 2063 to the maximum cross-sectional area of the fluid passage 2062A of the transition section-disposed portion 2062 is at least 1.1, such as, for example, at least 1.2, such as, for example at least 1.25. In some embodiments, for example, the ratio of the minimum cross-sectional area of the fluid passage 2061A of the vertical section-disposed portion 2061 to the maximum cross-sectional area of the fluid passage 2062A of the transition section-disposed portion 2062 is at least 1.1, such as, for example, at least 1.2, such as, for example at least 1.25. In some embodiments, for example, the ratio of the minimum cross-sectional area of the fluid passage 2063A of the horizontal section-disposed portion 2063 to the maximum cross-sectional area of the fluid passage 2062A of the transition section-disposed portion 2062 is at least 1.1, such as, for example, at least 1.2, such as, for example at least 1.25, and also the ratio of the minimum cross-sectional area of the fluid passage 2061A of the vertical section-disposed-portion 2061 to the maximum cross-sectional area of the fluid passage 2062A of the transition section disposed portion 2062 is at least 1.1, such as, for example, at least 1.2, such as, for example at least 1.25.

In some embodiments, for example, the transition section-disposed portion 2062 extends along a curved path. In some embodiments, for example, the length of the transition section-disposed portion 2062, as measured along the central longitudinal axis of the section-disposed portion 2062, is at least 50 feet, such as, for example, at least 100 feet, such as, for example, at least 200 feet, such as, for example, at least 300 feet, such as, for example, at least 400 feet, such as, for example, at least 500 feet.

In some embodiments, for example, the vertical section-disposed portion 2061 includes an operative vertical section-disposed portion and the operative vertical section-disposed portion has a length, measured along the central longitudinal axis of the fluid passage 2061A of the vertical section-disposed portion 2061, that is at least 50% (such as, for example, at least 75%, such as, for example, 100%) of the length of the vertical section-disposed portion 2061 measured along the central longitudinal axis of the fluid passage 2061A of the vertical section-disposed portion 2061, the transition section-disposed portion 2062 includes an operative transition section-disposed portion and the operative transition section-disposed portion has a length, measured along the central longitudinal axis of the fluid passage 2062A of the transition section-disposed portion 2062, that is at least 50% (such as, for example, at least 75%, such as, for example, 100%) of the length of the transition section-disposed portion 2062 measured along the central longitudinal axis of the fluid passage 2062A of the transition section-disposed portion 2062, and the horizontal section-disposed portion 2061 includes an operative horizontal section-disposed portion and the operative horizontal section-disposed portion has a length, measured along the central longitudinal axis of the fluid passage 2061C of the horizontal section-disposed portion 2061C, that is at least 50% (such as, for example, at least 75%, such as, for example, 100%) of the length of the horizontal section-disposed portion 2061 measured along the central longitudinal axis of the fluid passage 2061A of the horizontal section-disposed portion 2061, and the ratio of the minimum cross-sectional area of the fluid passage 2061A of the operative horizontal section-disposed portion 2061 to the maximum cross-sectional area of the fluid passage 2062A of the operative transition section-disposed portion is at least 1.1, such as, for example, at least 1.2, such as, for example at least 1.25. In some embodiments, for example, the ratio of the minimum cross-sectional area of the fluid passage 2061A of the operative vertical section-disposed portion to the maximum cross-sectional area of the fluid passage 2062A of the operative transition section disposed portion is at least 1.1, such as, for example, at least 1.2, such as, for example at least 1.25. In some embodiments, for example, the ratio of the minimum cross-sectional area of the fluid passage 2063A of the operative horizontal section-disposed portion to the maximum cross-sectional area of the fluid passage 2062A of the operative transition section disposed portion is at least 1.1, such as, for example, at least 1.2, such as, for example at least 1.25, and also the ratio of the minimum cross-sectional area of the fluid passage 2061A of the operative vertical section-disposed portion to the maximum cross-sectional area of the fluid passage 2062A of the transition section-disposed portion is at least 1.1, such as, for example, at least 1.2, such as, for example at least 1.25. In some embodiments, for example, the operative transition section-disposed portion extends along a curved path.

Figure 7A:
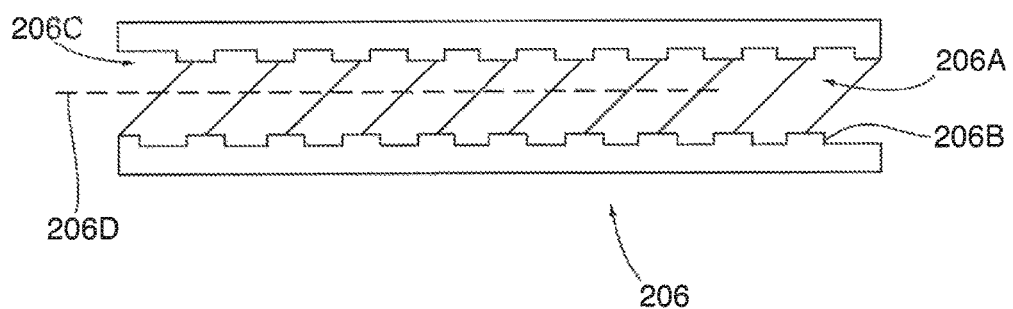
FIG. 7A is a sectional side elevation view of a section of the reservoir fluid-supplying conductor of the system illustrated in FIG. 6.
Figure 7B:
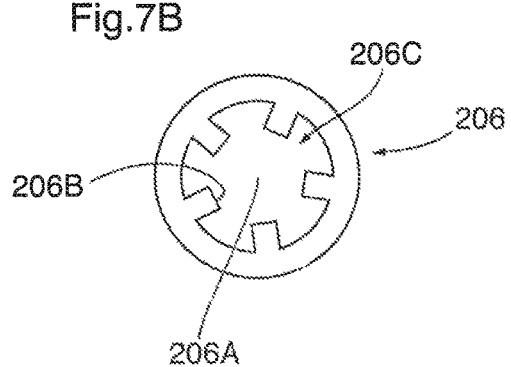
FIG. 7B is a sectional elevation view taken from one end of the section illustrated in FIG. 7A.
Figure 9:
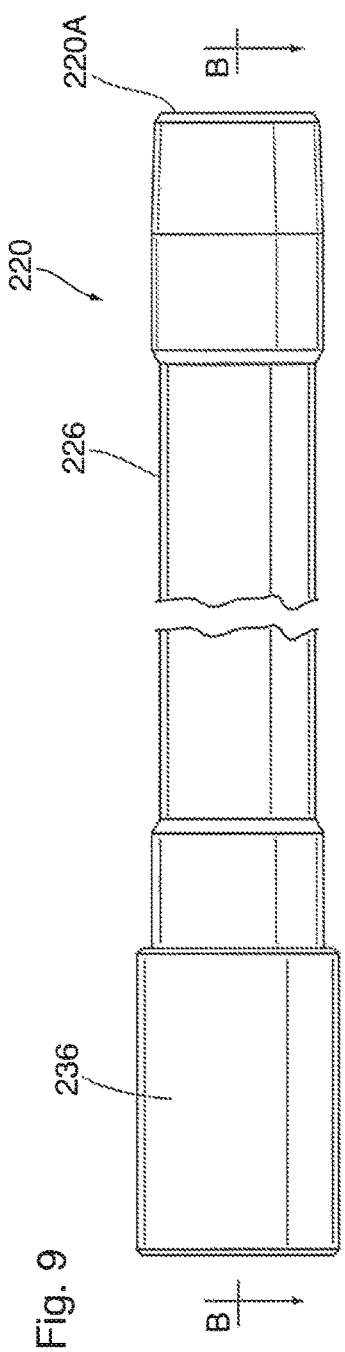
FIG. 9 is a side elevation view of the combination of a fluid conductor module and coupling that are integrated within the reservoir fluid-supplying conductor illustrated in FIG. 8.
Figure 10:
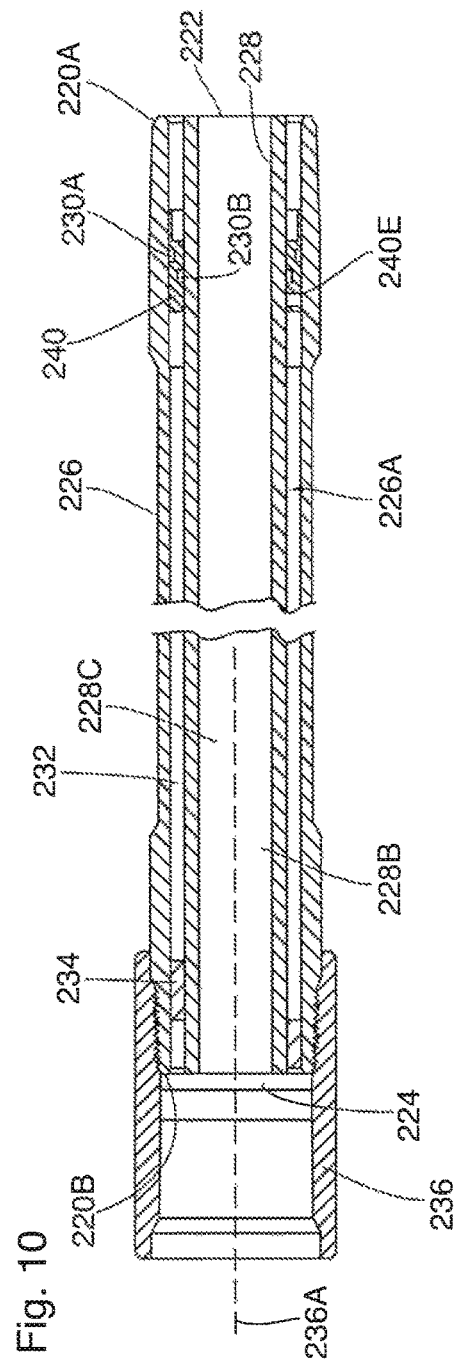
FIG. 10 is sectional side elevation view of the combination of a fluid conductor module and coupling illustrated in FIG. 9, taken along lines A-A.
Figure 12A:
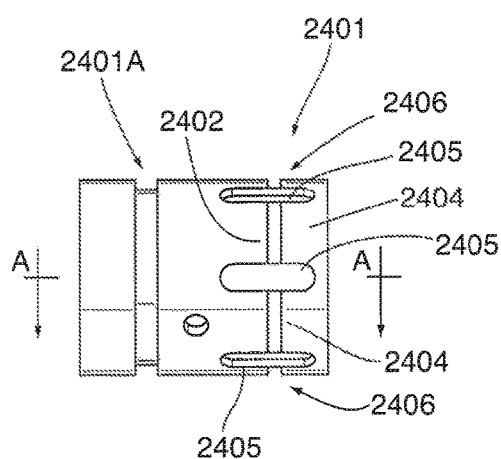
FIG. 12A is a side elevation view of another embodiment of a sealing ring for integration into the fluid conductor module illustrated in FIG. 9.
Figure 12B:
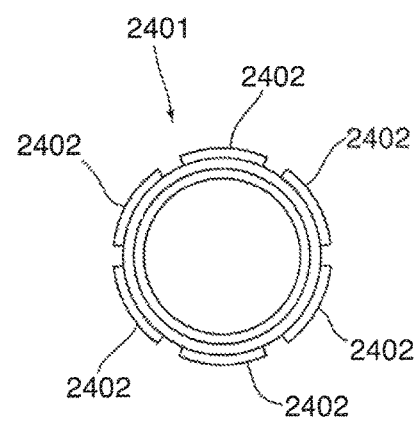
FIG. 12B is a view from one end of the sealing ring illustrated in FIG. 12A.
Figure 12C:
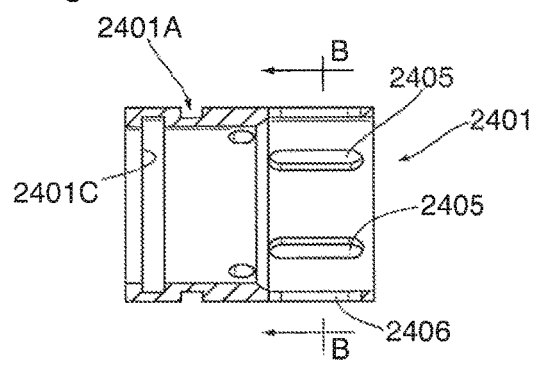
FIG. 12C is a sectional elevation view, taken along lines A-A in FIG. 12A, of the sealing ring illustrated in FIG. 12A.
Figure 12D:
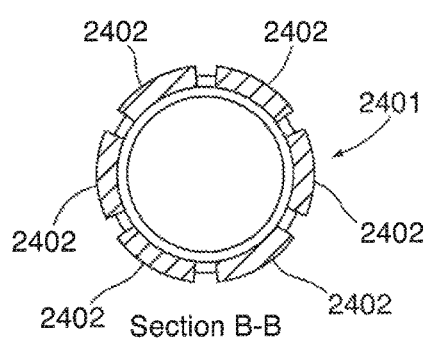
FIG. 12D is a section view elevation view, taken along lines B-B in FIG. 12C, of the sealing ring illustrated in FIG. 12A.

Referring to FIGS. 6, 7A, and 7B, the reservoir fluid-supplying conductor 206 includes an internal surface 206B that defines the fluid passage 206A for conducting the reservoir fluid that is received by the inlet 204. In some embodiments, for example, the internal surface 206B is that of the velocity string 207 such that the fluid passage 206A is defined by the fluid passage 207A.

In some embodiments, for example, the internal surface 206B of at least a section of the reservoir fluid-supplying conductor 206 is contoured with effect that reservoir fluid being conducted through the fluid passage 206A has a swirl flow component.

In some embodiments, for example, the internal surface 206B of at least a section of the reservoir fluid-supplying conductor 206 is contoured with effect that, while a reservoir fluid is being flowed through the fluid passage 206A, a swirl in the flow is induced.

In some embodiments, for example, the internal surface 206B of at least a section of the reservoir fluid-supplying conductor 206 is contoured for generating a swirl flow in reservoir fluid being conducted through the fluid passage 206A.

In some embodiments, for example, the swirl is disposed about the central longitudinal axis of the fluid passage 206A.

In some embodiments, for example, the contouring is defined by a rifled groove 206C, such as, for example, a helical rifled groove. In some embodiments, for example, the rifled groove has a minimum depth of at least 0.1 cm. In some embodiments, for example, the pitch of the rifled groove is between 30 degrees to 60 degrees, such as, for example, between 40 degrees and 55 degrees.

In some embodiments, for example, the contouring is defined by a plurality of spaced apart vanes extending into the fluid passage 206A.

In some embodiments, for example, the at least a section of the reservoir fluid-supplying conductor 206 (i.e. the "contoured portion section 206C"), whose internal surface 206B is contoured in any one of the configuration described above, defines at least 10% (such as, for example, at least 25%, such as, for example, at least 50%) of the total length of the fluid passage 206A as measured along the central longitudinal axis 2060D of the fluid passage 206A. In some embodiments, for example, the contoured portion section 206C has a length of at least 10 feet, as measured along the central longitudinal axis of the fluid passage 206A. In some embodiments, for example, the contoured portion section 206C has a length of at least 25 feet, as measured along the central longitudinal axis of the fluid passage 206A. In some embodiments, for example, the contoured portion section 206C has a length of at least 50 feet as measured along the central longitudinal axis of the fluid passage 206A. In some embodiments, for example, the contoured portion section 206C has a length of at least 100 feet as measured along the central longitudinal axis of the fluid passage 206A.

It is desirable to avoid slug flow through the reservoir fluid-supplying conductor 206, as this results in liquid loading. Liquid loading reduces recovery from the well. By enabling swirl flow, slug flow through the reservoir fluid-supplying conductor 206 is suppressed.

In some embodiments, for example, the internal surface 206B of the contoured portion section 206D is defined by a polymeric material liner, such that the contoured portion section 206D is lined with polymeric material, and such that the contoured portion section 206D is defined by a polymeric material-lined fluid conductor. By integrating the polymeric material liner, standard tubing (configured according to specifications the American Petroleum Institute ("API")) can be used for the conductor 206, and the cross-sectional flow of the standard tubing is attenuated by the liner to facilitate flow of the reservoir fluid at a desired speed. In this respect, in some embodiments, for example, the contouring is of the polymeric material liner. In some embodiments, for example, the polymeric material includes plastic material.

In some embodiments, for example, the reservoir fluid-supplying conductor 206 includes two or more spaced-apart contoured portion sections 206D. The contoured portion sections 206D are co-operatively disposed such that a desired swirl flow condition is effectible within the fluid passage 206A.

Referring to FIGS. 8, 9, 10, 11A, 11B, 11C, 12A, 12B, 12C, and 12D, in some embodiments, for example, the reservoir fluid supplying conductor 206 includes a fluid conductor module 220. In some embodiments, for example, the reservoir fluid supplying conductor 206 includes a plurality of fluid conductor modules 220, and each one of the modules 220, independently, has a configuration of the fluid conductor 220. In some embodiments, for example, the modules 220 are connected end-to-end. In some embodiments, for example, at least some of the modules 220 are spaced apart from one another. Each one of the modules, independently, functions as a fluid conductor. Each one of the modules 220, independently, includes a module inlet 222 and a module outlet 224 and is configured for conducting reservoir fluid, received at the module inlet 222, from the module inlet 222 to the module outlet 224.

Each one of the modules 220, independently, also includes, a first tubing 226, a second tubing 228, and a sealing member 230.

The second tubing 228 is disposed within the first tubing 226 such that an intermediate space 232 is defined between the first tubing 226 and the second tubing 228. In some embodiments, for example, the disposition of the second tubing 228 within the first tubing 226 is such that the second tubing 228 is nested within the first tubing 226. In some embodiments, for example, the intermediate space 232 is an annular space.

A sealed interface 230 is defined between the first tubing 226 and the second tubing 228. In some embodiments, for example, the sealed interface 230 is effected by one or more sealing members that are retained within the intermediate space 232.

Referring to FIGS. 11A, 11B and 11C, in this respect, in some embodiments, the sealed interface is effected by a ring 240 that is inserted and retained within the intermediate space 232 and couples the first and second tubing 226, 228. The ring 240 includes a pair of sealing members 230A, 230B. The sealing member 230A is retained within a groove 240A provided on an outermost surface 240B of the ring 240, and is disposed in sealing, or substantially sealing, engagement with the first tubing 226, while the sealing member 230B is retained within a groove 240C provided on an internal surface 240D of the ring 240, and is disposed in sealing, or substantially sealing, engagement with the second tubing 228. The ring 240 is disposed in an interference fit relationship relative to both of the first tubing 226 and the second tubing 228. The ring 240 includes an outwardly flared lip 242 that is engageable to the first tubing 226. The ring 240 is integrated into the intermediate space 232 by insertion within the intermediate space 232 in a downhole direction while oriented with the flared lip 242 extending outwardly in the uphole direction. While moving in the downhole direction, the lip 242, due to its resiliency, is pressed inwardly and does not substantially interfere with movement of the ring 240 in the downhole direction. Upon desired positioning of the sealing members 230A, 230B, a force is applied to the ring 240 in an uphole direction, and the flared lip 242, while defining the sealed interface between the first tubing 226 and the second tubing 228.

An alternative ring 2401 is illustrated in FIGS. 12A, 12B, 12C and 12D. In this embodiment, the ring 2401 includes a plurality of grippers 2402 that are biased outwardly, relative to the central longitudinal axis of the ring 2401, by resilient members 2404. In some embodiments, for example, the resilient members 2404 are in the form of collet springs (for example, beam springs), that are separated by slots 2405. In some embodiments, for example, a gripper 2402 is disposed on a respective collet spring 2404. In some embodiments, for example, the gripper 2402 is defined as a protuberance extending from the collet spring 2404. In some embodiments, for example, the collet springs 2404 are configured for a limited amount of compression in response to a compressive force applied inwardly relative to a central longitudinal axis of the ring 2401, as the ring 2401 is being inserted into the intermediate space 232 in a downhole direction. Each one of the grippers 2402 extends outwardly from the respective collet spring 2404, relative to the central longitudinal axis of the ring 2401, and terminates at a tip 2406 (such as, for example, a sharp tip) configured to exert a gripping force on the first tubing 226. Extension of the gripper 2402 from the collet spring 2404 is tapered in a downhole direction. This, in combination with the resiliency of the collet springs 2404, enables the ring 2401 to be inserted into the intermediate space 232 in a downhole direction, without substantial interference by the gripper 2402. Upon desired positioning of the sealing members 230A, 230B (disposed in grooves 2401A, C), a force is applied to the ring 2401 in an uphole direction, and the grippers 2402 become disposed in gripping engagement with the first tubing 226 with effect that the ring 2401 couples the first tubing 226 to the second tubing 228, while defining the sealed interface between the first tubing 226 and the second tubing 228.

In some embodiments, for example, the module inlet 222, the module outlet 224, the first tubing 226, the second tubing 228, and the sealing member 230 are co-operatively configured such that, while: the assembly 10 is disposed within a wellbore and oriented such that the inlet 204 is disposed downhole relative to the pump suction 302, the module is integrated within the reservoir fluid-supplying conductor 206 such that the module inlet 222 is disposed downhole relative to the module outlet 224, and reservoir fluid flow is being received by the module inlet 222 while being conducted through the production string 202: (i) the received reservoir fluid flow is conducted, via the second tubing, to the module outlet 224, and (ii) the sealed interface prevents, or substantially prevents, the received reservoir fluid, being conducted by the second tubing 228, from bypassing the module outlet 224. In some embodiments, for example, the bypassing includes bypassing of the module outlet 224 by flow in a downhole direction via the intermediate space 232. In some embodiments, for example, the bypassing includes bypassing of the module outlet 224 by flow in a downhole direction via the intermediate space 232, towards the module inlet 222.

In some embodiments, for example, the module inlet 222, the module outlet 224, the first tubing 226, the second tubing 228, and the sealing member 230 are co-operatively configured such that, while: the assembly 10 is disposed within a wellbore, and the module 220 is integrated within the reservoir fluid-supplying conductor 206 such that the module inlet 222 is disposed downhole relative to the module outlet 224: (i) reservoir fluid flow that is receivable by the module inlet 222 is conductible, via the second tubing 224, to the module outlet 224, and (ii) the sealing member 230 defines a sealed interface preventing, or substantially preventing, fluid communication, via the intermediate space 232, between the module inlet 222 and the module outlet 224.

In some embodiments, for example, the module 220 includes a centralizer 234. The second tubing 228 is centralized relative to the first tubing 228 with the centralizer 234. In some embodiments, for example, the centralizer 234 includes a C-clip.

In some embodiments, for example, the intermediate space 232 includes a gas accumulation space 232A, disposed: (i) between the sealed interface 230 and the module inlet 222, and (ii) in fluid communication with the module inlet 222. When the module 220 is part of the assembly 10, the gas accumulation space 232A is disposed downhole relative to the sealed interface 230. While: the assembly 10 is disposed within a wellbore and oriented such that the inlet 204 is disposed downhole relative to the pump suction 302, and the module 220 is integrated within the reservoir fluid-supplying conductor 206 such that the module inlet 222 is disposed downhole relative to the module outlet 224, the presence of a gas accumulation space 232A provides the opportunity for gaseous material, within the reservoir fluid received by the module inlet 222, to accumulate within the gas accumulation space 232A. In some embodiments, for example, when the gas accumulation space 232 is sufficiently large, sufficient gaseous material is potentially collectible within the gas accumulation space 232A such that, during transient periods when the pressure of the reservoir fluid received by the module inlet 222 becomes sufficiently low, the accumulated gaseous material (which, in these circumstances, would be disposed at a greater pressure than the reservoir fluid being received by the module inlet 222) is induced to admix with the reservoir fluid such that a gaseous slug is created within the reservoir fluid flow. The presence of a gaseous slug within the reservoir fluid could be detrimental to the performance of the separator 600, and, relatedly, is therefore, could be detrimental to the performance of the pump 300. In this respect, in some embodiments, the presence of a gas accumulation space 232A, when sufficiently large, could adversely affect production of the reservoir fluid.

To at least mitigate its detrimental effect on production, in some embodiments, for example, the volume occupied by the gas accumulation space 232A is as small as possible. In some embodiments, for example, the total volume of the gas accumulation space 232A is less than 20% (such as, for example, less than 10%, such as, for example, less than 5%), of the total volume of the intermediate space 232, and, in some of these embodiments, for example, there is an absence, or substantial absence, of the gas accumulation space 232A.

In some embodiments, for example, the second tubing 228 includes a second tubing inlet 228A for receiving reservoir fluid for the conducting by the second tubing 228, and the module inlet 222, the module outlet 224, the first tubing 226, the second tubing 228, and the sealing member 230 are co-operatively configured such that, while: the assembly 10 is disposed within a wellbore, and the module 220 is integrated within the reservoir fluid-supplying conductor 206 such that the module inlet 222 is disposed downhole relative to the module outlet 224: the gas accumulation space 232A is disposed uphole of the second tubing inlet 228A. In this respect, in some embodiments, for example, the gas accumulation space 232A is recessed relative to the second tubing inlet 228. In some embodiments, for example, the establishment of a gas accumulation space 232A is unavoidable, as the module 200 is originally configured with one end 220A defined by the second tubing 228, and with the first tubing 226 spaced apart from the end 220A so as to permit for a re-cut of the end 220A. In some embodiments, for example, the gas accumulation space 232A is defined by the positioning of the sealed interface 230 relative to the intermediate space 232, such that the positioning of the sealed interface 230 relative to the intermediate space 232 determines the volume occupied by the gas accumulator space 232A.

Referring to FIGS. 13, 13A, 13B, 13C, 13D, 13E, 13F, 13G, 13H, 13J, 13K, 13L, and 13M, in some embodiments, for example, the first tubing 226 and the second tubing 228 are coupled together by mechanical interference via assembly 2200. In this respect, the assembly 2200 includes a coupler 2202 (such as, for example, a slimhole coupler) and a threaded hanger 2204 (see FIGS. 13C and 13D). The first tubing 226 is threadably coupled to the coupler 2202, and, co-operatively, the hanger 2204 is also threadably coupled to the coupler 2202. The second tubing 228 is flared at its outlet 228B. The second tubing 228 and assembly 2200 are co-operatively configured such that the assembly 2200 limits downhole movement of the second tubing 228 relative to the first tubing 226 by mechanical interference between the hanger 2204 and the flared outlet 228B. Relatedly, the second tubing 228 is crimped intermediate its inlet and outlet ends 228A, 228B to define a mechanical interference-effecting portion 228F (such as, for example, in the form of a bulge). The second tubing and the assembly 2200 are co-operatively configured such that the assembly 2200 limits uphole movement of the second tubing 228 relative to the first tubing 226 by mechanical interference between the assembly 2200 and the mechanical interference-effecting portion 228F. More specifically, the assembly 2200 additionally includes a spacer 2206 (see FIGS. 13E and F), a sealing member 2208 (see FIGS. 13G and H; as well, for example, the sealing member 2208 includes a rubber bushing of Viton™ material), and retainers 2210A, 2210B (see Figures J and K) disposed on either side of the sealing member 2208. The spacer 2206, the sealing member 2208, and the retainers 2210A, 2210B are pressed between the hanger 224 and the mechanical interference-effecting portion 228F. In this respect, the second tubing 228 is retained relative to the first tubing 226 by virtue of the combination of the assembly 2200 and the coupler 2202. As well, the sealed interface 230 is effected by sealing engagement of the sealing member 2208 to both of the first tubing 226 and the second tubing 228.

In some embodiments, for example, the intermediate space 232 includes a fluid accumulation space 232B, disposed: (i) between the sealed interface 230 and the module outlet 224, and (ii) in fluid communication with the module outlet 224.

When the module 220 is part of the assembly 10, the fluid accumulation space 232B is disposed downhole relative to the sealed interface 230. While: the assembly 10 is disposed within a wellbore and the module 220 is integrated within the reservoir fluid-supplying conductor 206 such that the module inlet 222 is disposed downhole relative to the module outlet 224, the presence of a fluid accumulation space 232B provides the opportunity for fluid material, including liquid material of the reservoir fluid received by the module inlet 222, to accumulate within the fluid accumulation space 232B. In some embodiments, such accumulation could result in corrosion of components of the assembly 10 that are disposed in communication with the accumulated fluid. To at least mitigate this corrosion, in some embodiments, for example, the volume occupied by the fluid accumulation space 232B is as small as possible. In some embodiments, for example, the total volume of the fluid accumulation space 232B is less than 20% (such as, for example, less than 10%, such as, for example, less than 5%), of the total volume of the intermediate space 232, and, in some of these embodiments, for example, there is an absence, or substantial absence, of the fluid accumulation space 232B In some embodiments, for example, the second tubing 228 is centralized relative to the first tubing 226 by a centralizer 2210 (see FIGS. 13L and M). The centralizer 2210 is disposed between and retained relative to the first tubing 226 and the second tubing 228 by spaced-apart mechanical interference-effecting portions 228D, 228E (such as, for example, spaced-apart bulges) that are formed by crimping of the second tubing 228. The mechanical interference-effecting portions 228D, 228E are disposed closer to the inlet end 228A relative to the mechanical interference-effecting portion 228F. Amongst other things, the centralizer 2210 facilitates assembly of the module 220.

The assembly of the embodiment illustrated in FIG. 13 will now be described. The second tubing 228 is inserted through the hanger 224, the spacer 2206, the retainer 2210A, the sealing member 2208, and the retainer 2210B. The outlet end 228B is then flared. After flaring, the hanger 224, the spacer 2206, the retainer 2210A, the sealing member 2208, and the retainer 2210B are pushed up against the flare, and the second tubing 228 is crimped behind these components to obtain the mechanical interference-effecting portion 228F, such that the hanger 224, the spacer 2206, the retainer 2210A, the sealing member 2208, and the retainer 2210B are retained relative to the second tubing 228 between the flare and the mechanical interference-effecting portion 228F. The second tubing 228 is also inserted through the centralizer 2210, and then the mechanical interference-effecting portions 228D, 228E are formed on either side of the centralizer 2210, such that the centralizer 2210 becomes retained to the second tubing 228 between the portions 228D, 228E. The hanger 224 is then threaded to the coupler 2202 such that the second tubing 228 becomes coupled to the coupler 2202 via the hanger 224, to obtain an intermediate assembly. The intermediate assembly and the first tubing 226 are co-operatively manipulated such that the second tubing 228 becomes inserted into the first tubing 226, and the coupler 2202 becomes threadably coupled to the first tubing 226 such that the second tubing 228 becomes coupled to the first tubing 226 via the hanger 224 and the coupler 2202, and such that the sealed interface 230 is established by sealing engagement of the sealing member 2208 to both of the first tubing 226 and the second tubing 228.

As illustrated, in some embodiments, for example, the coupler 2202 is part of a coupler that also function to effect coupling of the first tubing 226 and the second tubing 228 of a second flow conductor module 220, similarly as described above, and, in this respect, is also part of another flow control module 220. In the illustrated embodiment, the coupler 2202 includes a first integration portion 2202A effecting coupling of the first tubing 226 and the second tubing 228 of the module 220, as shown, and also includes a second integration portion 2202A for effecting coupling (not shown) of the first tubing 226 and the second tubing 228 of another module 220

In some embodiments, for example, the second tubing 228 includes a second tubing passage 228B, and the first tubing 226 includes a first tubing passage 226A and the disposition of the second tubing 228 within the first tubing 226 is defined by a disposition of the second tubing 228B within the first tubing passage 226A.

In some embodiments, for example, the second tubing includes a central longitudinal axis 228C, and the length of the second tubing 228, along the central longitudinal axis 228C is at least five (5) feet, such as, for example, at least ten (10) feet, such as, for example, at least 20 feet.

In some embodiments, for example, the first tubing 226 defines an outermost surface portion of the module 220.

By disposing the second tubing 228 within the first tubing 226, standard tubing (configured according to specifications of the American Petroleum Institute ("API")) can be used for the first tubing 226 to facilitate handling and manipulation by standard oilfield tools, while the second tubing 228 could be used to define a desirable cross-sectional flow area so as to facilitate flow of the reservoir fluid at a desired speed. In some embodiments, for example, the second tubing includes a section of coiled tubing.

As well, by providing a larger effective outside diameter, by disposing a relatively smaller diameter second tubing 228 within a relatively larger diameter first tubing 226, it is easier to retrieve (such as, for example, for the purposes of servicing) an assembly 10 that has been deployed around a bend (such as, for example, at a kick-off point) such that a meaningful sump 124 is established. The larger diameter tubing provides for more pull capacity.

In some embodiments, for example, two or more modules 220 are connectible, end-to-end, such that at least a portion of the reservoir fluid-supplying conductor 206 includes the two or more modules 220. In this respect, in some embodiments, for example, the module 220 is configured for threaded connection. In some embodiments, for example, the module 220 includes first and second ends 220A, 220B, and each one of the ends 220A, 220B, independently, includes an outer surface portion that defines male threads. In some embodiments, for example, the connecting of two modules 220 is effected by a threaded coupler 236. In some embodiments, for example, the coupler 236 includes a central longitudinal axis 236A, and the central longitudinal axis 236A is disposed in alignment, or substantial alignment, with the central longitudinal axis 228C of the second tubing 228.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

What is claimed is:

1. A system comprising a reservoir fluid conduction assembly disposed within a wellbore string lining a wellbore extending into a subterranean formation, such that an intermediate wellbore space is defined within a space disposed between the wellbore string and the assembly, wherein the assembly comprises:
   a reservoir fluid-supplying conductor configured for conducting reservoir fluid received from a downhole wellbore space of the wellbore;
   a flow diverter body comprising:
      a diverter body-defined reservoir fluid conductor configured for conducting reservoir fluid, that is supplied from the reservoir fluid-supplying conductor, to a reservoir fluid separation space of an uphole wellbore space of the wellbore, the uphole wellbore space disposed uphole relative to the downhole wellbore space; and
      a diverter body-defined gas-depleted reservoir fluid conductor configured for receiving gas-depleted reservoir fluid and conducting the received gas-depleted reservoir fluid for effecting supplying of the gas-depleted reservoir fluid to a gas-depleted reservoir fluid-producing conductor; and
   a sealed interface configured for preventing, or substantially preventing, bypassing of the diverter body-defined reservoir fluid conductor by the separated gas-depleted reservoir fluid;
wherein:
   the flow diverter body, the sealed interface, and the reservoir fluid-supplying conductor are co-operatively configured such that, while the reservoir fluid-supplying conductor is receiving reservoir fluid from the downhole wellbore space that has been received within the downhole wellbore space from the subterranean formation:
      the reservoir fluid is conducted to the diverter body-defined reservoir fluid conductor via the reservoir fluid-supplying conductor;
      the reservoir fluid is conducted by the diverter body-defined reservoir fluid conductor and discharged to a reservoir fluid separation space of the uphole wellbore space;
      within the reservoir fluid separation space, a gas-depleted reservoir fluid is separated from the discharged reservoir fluid, in response to at least buoyancy forces; and
      the separated gas-depleted reservoir fluid is conducted to the diverter body-defined gas-depleted reservoir fluid-diverting conductor, via the intermediate wellbore space, for conduction to the surface via a gas-depleted reservoir fluid producing conductor;
   the reservoir fluid separation space defines a separation-facilitating space portion of the intermediate wellbore space;
   the reservoir fluid-supplying conductor comprises:
      a vertical section-disposed portion that defines a respective fluid passage, the vertical section-disposed portion having a central longitudinal axis that is less than 20 degrees relative to the vertical;
      a horizontal section-disposed portion that defines a respective fluid passage, the horizontal-section disposed portion having a central longitudinal axis that is between 70 and 110 degrees relative to the vertical; and
      a transition section-disposed portion that defines a respective fluid passage, the transition section-disposed portion disposed between the vertical section-disposed portion and the horizontal section-disposed portion; and
   a cross-sectional area of the fluid passage of the transition section-disposed portion is less than both of:
      (i) a cross-sectional area of the fluid passage of the vertical section-disposed portion, and (ii) a cross-sectional area of the fluid passage of the horizontal section-disposed portion.

2. The assembly as claimed in claim 1;
wherein the sealed interface is configured to prevent, or substantially prevent, flow communication, via the intermediate wellbore space, between the downhole wellbore space and the uphole wellbore space.

3. The system as claimed in claim 1;
wherein the ratio of the minimum cross-sectional area of the fluid passage of the horizontal section-disposed portion to the maximum cross-sectional area of the fluid passage of the transition section-disposed portion is at least 1.1.

4. The system as claimed in claim 1;
wherein the ratio of the minimum cross-sectional area of the fluid passage of the vertical section-disposed portion to the maximum cross-sectional area of the fluid passage of the transition section-disposed portion is at least 1.1.

5. The system as claimed in claim 1;
wherein:
the ratio of the minimum cross-sectional area of the fluid passage of the horizontal section-disposed portion to the maximum cross-sectional area of the fluid passage of the transition section-disposed portion is at least 1.1; and
the ratio of the minimum cross-sectional area of the fluid passage of the vertical section-disposed portion to the maximum cross-sectional area of the fluid passage of the transition section-disposed portion is at least 1.1.

6. The system as claimed in claim 1;
wherein the transition section-disposed portion extends along a curved path.

7. The system as claimed in claim 1;
wherein:
the vertical section-disposed portion comprises an operative vertical section-disposed portion that defines a respective fluid passage, the operative vertical section-disposed portion having a length, measured along the central longitudinal axis of the vertical section-disposed portion, that is at least 50% of the length of the vertical section-disposed portion measured along the central longitudinal axis of the vertical section-disposed portion;
the transition section-disposed portion comprises an operative transition section-disposed portion that defines a respective fluid passage, the operative transition section-disposed portion having a length, measured along the central longitudinal axis of the transition section-disposed portion, that is at least 50% of the length of the transition section-disposed portion measured along the central longitudinal axis of the transition section-disposed portion;
the horizontal section-disposed portion comprises an operative horizontal section-disposed portion that defines a respective fluid passage, the operative horizontal section-disposed portion having a length, measured along the central longitudinal axis of the horizontal section-disposed portion, that is at least 50% of the length of the horizontal section-disposed portion measured along the central longitudinal axis of the horizontal section-disposed portion; and
the ratio of the minimum cross-sectional area of the fluid passage of the operative horizontal section-disposed portion to the maximum cross-sectional area of the fluid passage of the operative transition section-disposed portion is at least 1.1.

8. The system as claimed in claim 7;
wherein the transition section-disposed portion extends along a curved path.

9. The system as claimed in claim 1;
wherein:
the vertical section-disposed portion comprises an operative vertical section-disposed portion that defines a respective fluid passage, the operative vertical section-disposed portion having a length, measured along the central longitudinal axis of the vertical section-disposed portion, that is at least 50% of the length of the vertical section-disposed portion measured along the central longitudinal axis of the vertical section-disposed portion;
the transition section-disposed portion comprises an operative transition section-disposed portion that defines a respective fluid passage, the operative transition section-disposed portion having a length, measured along the central longitudinal axis of the transition section-disposed portion, that is at least 50% of the length of the transition section-disposed portion measured along the central longitudinal axis of the transition section-disposed portion;
the horizontal section-disposed portion comprises an operative horizontal section-disposed portion that defines a respective fluid passage, the operative horizontal section-disposed portion having a length, measured along the central longitudinal axis of the horizontal section-disposed portion, that is at least 50% of the length of the horizontal section-disposed portion measured along the central longitudinal axis of the horizontal section-disposed portion; and
the ratio of the minimum cross-sectional area of the fluid passage of the operative vertical section-disposed portion to the maximum cross-sectional area of the fluid passage of the operative transition section-disposed portion is at least 1.1.

10. The system as claimed in claim 1;
wherein:
the vertical section-disposed portion comprises an operative vertical section-disposed portion that defines a respective fluid passage, the operative vertical section-disposed portion having a length, measured along the central longitudinal axis of the vertical section-disposed portion, that is at least 50% of the length of the vertical section-disposed portion measured along the central longitudinal axis of the vertical section-disposed portion;
the transition section-disposed portion comprises an operative transition section-disposed portion that defines a respective fluid passage, the operative transition section-disposed portion having a length, measured along the central longitudinal axis of the transition section-disposed portion, that is at least 50% of the length of the transition section-disposed portion measured along the central longitudinal axis of the transition section-disposed portion;
the horizontal section-disposed portion comprises an operative horizontal section-disposed portion that defines a respective fluid passage, the operative horizontal section-disposed portion having a length, measured along the central longitudinal axis of the horizontal section-disposed portion, that is at least 50% of the length of the horizontal section-disposed portion measured along the central longitudinal axis of the horizontal section-disposed portion;
the ratio of the minimum cross-sectional area of the fluid passage of the operative horizontal section-disposed portion to the maximum cross-sectional area of the fluid passage of the operative transition section-disposed portion is at least 1.1; and
the ratio of the minimum cross-sectional area of the fluid passage of the operative vertical section-disposed portion to the maximum cross-sectional area of the fluid passage of the operative transition section-disposed portion is at least 1.1.

11. The system as claimed in claim 10;
wherein the length of the operative transition section-disposed portion, measured along the central longitudinal axis of the transition section-disposed portion, is at least 50 feet.

12. The system as claimed in claim 1;
wherein the transition section-disposed portion joins the vertical section-disposed portion to the horizontal section-disposed portion.

13. A reservoir fluid production system disposed within a wellbore extending through a subterranean formation comprising:
a pump;
a separation zone defined within the wellbore;
a reservoir fluid conductor configured for receiving reservoir fluid from the subterranean formation via the wellbore and conducting the received reservoir fluid to the separation zone, wherein the reservoir fluid conductor comprises:
  a vertical section-disposed portion that defines a respective fluid passage, the vertical section-disposed portion having a central longitudinal axis that is less than 20 degrees relative to the vertical;
  a horizontal section-disposed portion that defines a respective fluid passage, the horizontal section-disposed portion having a central longitudinal axis that is between 70 and 110 degrees relative to the vertical; and
  a transition section-disposed portion that defines a respective fluid passage, the transition section-disposed portion disposed between the vertical section-disposed portion and the horizontal section-disposed portion;
  wherein a cross-sectional area of the fluid passage of the transition section-disposed portion is less than both of: (i) a cross-sectional area of the fluid passage of the vertical section-disposed portion, and (ii) a cross-sectional area of the fluid passage of the horizontal section-disposed portion;
a gas-depleted reservoir fluid conductor configured for conducting the separated gas-depleted reservoir fluid to the pump;
wherein:
  the reservoir fluid conductor, the separation zone, and the gas-depleted reservoir fluid conductor are co-operatively configured such that, while reservoir fluid is being received by the reservoir fluid conductor and conducted to the separation zone:
    within the separation zone, a gas-depleted reservoir fluid is separated from the reservoir fluid in response to at least buoyancy forces and is received by the gas-depleted reservoir fluid conductor and conducted to the pump; and
    the pump is configured for pressurizing the gas-depleted reservoir fluid.

14. The system as claimed in claim 13;
further comprising a sealed interface configured for preventing, or substantially preventing, the separated gas-depleted reservoir fluid from bypassing the gas-depleted reservoir fluid conductor;
wherein:
  the gas-depleted reservoir fluid conductor comprises a gas-depleted reservoir fluid receiver, such that the receiving of the gas-depleted reservoir fluid by the gas-depleted reservoir fluid conductor is effected by the gas-depleted reservoir fluid receiver; and
  the gas-depleted reservoir fluid receiver is disposed downhole relative to the separation zone.

15. The system as claimed in claim 14;
wherein the transition section-disposed portion extends along a curved path.

16. The system as claimed in claim 15;
wherein the transition section-disposed portion joins the vertical section-disposed portion to the horizontal section-disposed portion.

17. The system as claimed in claim 13;
wherein the ratio of the minimum cross-sectional area of the fluid passage of the horizontal section-disposed portion to the maximum cross-sectional area of the fluid passage of the transition section-disposed portion is at least 1.1.

18. The system as claimed in claim 13;
wherein the ratio of the minimum cross-sectional area of the fluid passage of the vertical section-disposed portion to the maximum cross-sectional area of the fluid passage of the transition section-disposed portion is at least 1.1.

19. The system as claimed in claim 13;
wherein:
  the ratio of the minimum cross-sectional area of the fluid passage of the horizontal section-disposed portion to the maximum cross-sectional area of the fluid passage of the transition section-disposed portion is at least 1.1; and
  the ratio of the minimum cross-sectional area of the fluid passage of the vertical section-disposed portion to the maximum cross-sectional area of the fluid passage of the transition section-disposed portion is at least 1.1.

20. The system as claimed in claim 19;
further comprising a sealed interface configured for preventing, or substantially preventing, the separated gas-depleted reservoir fluid from bypassing the gas-depleted reservoir fluid conductor;
wherein:
  the gas-depleted reservoir fluid conductor comprises a gas-depleted reservoir fluid receiver, such that the receiving of the gas-depleted reservoir fluid by the gas-depleted reservoir fluid conductor is effected by the gas-depleted reservoir fluid receiver; and
  the gas-depleted reservoir fluid receiver is disposed downhole relative to the separation zone.

21. The system as claimed in claim 20;
wherein the transition section-disposed portion extends along a curved path.

22. The system as claimed in claim 20;
wherein the transition section-disposed portion joins the vertical section-disposed portion to the horizontal section-disposed portion.

23. The system as claimed in claim 13;
wherein:
  the vertical section-disposed portion comprises an operative vertical section-disposed portion that defines a respective fluid passage, the operative vertical section-disposed portion having a length, measured along the central longitudinal axis of the vertical section-disposed portion, that is at least 50% of the length of the vertical section-disposed portion measured along the central longitudinal axis of the vertical section-disposed portion;
  the transition section-disposed portion comprises an operative transition section-disposed portion that defines a respective fluid passage, the operative transition section-disposed portion having a length, measured along the central longitudinal axis of the transition section-disposed portion, that is at least 50% of the length of the transition section-disposed portion measured along the central longitudinal axis of the transition section-disposed portion;

the horizontal section-disposed portion comprises an operative horizontal section-disposed portion that defines a respective fluid passage, the operative horizontal section-disposed portion having a length, measured along the central longitudinal axis of the horizontal section-disposed portion, that is at least 50% of the length of the horizontal section-disposed portion measured along the central longitudinal axis of the horizontal section-disposed portion; and the ratio of the minimum cross-sectional area of the fluid passage of the operative horizontal section-disposed portion to the maximum cross-sectional area of the fluid passage of the operative transition section-disposed portion is at least 1.1.

24. The system as claimed in claim 13;
wherein:
the vertical section-disposed portion comprises an operative vertical section-disposed portion that defines a respective fluid passage, the operative vertical section-disposed portion having a length, measured along the central longitudinal axis of the vertical section-disposed portion, that is at least 50% of the length of the vertical section-disposed portion measured along the central longitudinal axis of the vertical section-disposed portion;

the transition section-disposed portion comprises an operative transition section-disposed portion that defines a respective fluid passage, the operative transition section-disposed portion having a length, measured along the central longitudinal axis of the transition section-disposed portion, that is at least 50% of the length of the transition section-disposed portion measured along the central longitudinal axis of the transition section-disposed portion;

the horizontal section-disposed portion comprises an operative horizontal section-disposed portion that defines a respective fluid passage, the operative horizontal section-disposed portion having a length, measured along the central longitudinal axis of the horizontal section-disposed portion, that is at least 50% of the length of the horizontal section-disposed portion measured along the central longitudinal axis of the horizontal section-disposed portion; and the ratio of the minimum cross-sectional area of the fluid passage of the operative vertical section-disposed portion to the maximum cross-sectional area of the fluid passage of the operative transition section-disposed portion is at least 1.1.

25. The system as claimed in claim 13;
wherein:
the vertical section-disposed portion comprises an operative vertical section-disposed portion that defines a respective fluid passage, the operative vertical section-disposed portion having a length, measured along the central longitudinal axis of the vertical section-disposed portion, that is at least 50% of the length of the vertical section-disposed portion measured along the central longitudinal axis of the vertical section-disposed portion;

the transition section-disposed portion comprises an operative transition section-disposed portion that defines a respective fluid passage, the operative transition section-disposed portion having a length, measured along the central longitudinal axis of the transition section-disposed portion, that is at least 50% of the length of the transition section-disposed portion measured along the central longitudinal axis of the transition section-disposed portion;

the horizontal section-disposed portion comprises an operative horizontal section-disposed portion that defines a respective fluid passage, the operative horizontal section-disposed portion having a length, measured along the central longitudinal axis of the horizontal section-disposed portion, that is at least 50% of the length of the horizontal section-disposed portion measured along the central longitudinal axis of the horizontal section-disposed portion;

the ratio of the minimum cross-sectional area of the fluid passage of the operative horizontal section-disposed portion to the maximum cross-sectional area of the fluid passage of the operative transition section-disposed portion is at least 1.1; and the ratio of the minimum cross-sectional area of the fluid passage of the operative vertical section-disposed portion to the maximum cross-sectional area of the fluid passage of the operative transition section-disposed portion is at least 1.1.

26. The system as claimed in claim 25;
wherein the length of the operative transition section-disposed portion, measured along the central longitudinal axis of the transition section-disposed portion, is at least 50 feet.

27. The system as claimed in claim 13;
further comprising a sealed interface configured for preventing, or substantially preventing, the separated gas-depleted reservoir fluid from bypassing the gas-depleted reservoir fluid conductor;
wherein:
the gas-depleted reservoir fluid conductor comprises a gas-depleted reservoir fluid receiver, such that the receiving of the gas-depleted reservoir fluid by the gas-depleted reservoir fluid conductor is effected by the gas-depleted reservoir fluid receiver; and
the gas-depleted reservoir fluid receiver is disposed downhole relative to the separation zone.

28. The system as claimed in claim 27;
wherein the transition section-disposed portion extends along a curved path.

29. The system as claimed in claim 28;
wherein the transition section-disposed portion joins the vertical section-disposed portion to the horizontal section-disposed portion.

30. The system as claimed in claim 29;
wherein the length of the operative transition section-disposed portion, measured along the central longitudinal axis of the transition section-disposed portion, is at least 50 feet.

* * * * *